(12) United States Patent
Fletcher et al.

(10) Patent No.: US 10,107,240 B2
(45) Date of Patent: Oct. 23, 2018

(54) CHECK VALVES AND VENTURI DEVICES HAVING THE SAME

(71) Applicants: David E. Fletcher, Flint, MI (US); Brian M. Graichen, Leonard, MI (US); Matthew C. Gilmer, Whitmore Lake, MI (US); Andrew D. Niedert, New Hudson, MI (US); James H. Miller, Ortonville, MI (US); Keith Hampton, Ann Arbor, MI (US)

(72) Inventors: David E. Fletcher, Flint, MI (US); Brian M. Graichen, Leonard, MI (US); Matthew C. Gilmer, Whitmore Lake, MI (US); Andrew D. Niedert, New Hudson, MI (US); James H. Miller, Ortonville, MI (US); Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/181,647

(22) Filed: Jun. 14, 2016

(65) Prior Publication Data
US 2016/0356250 A1 Dec. 8, 2016

Related U.S. Application Data

(63) Continuation-in-part of application No. 14/678,106, filed on Apr. 3, 2015.
(Continued)

(51) Int. Cl.
*F16K 24/00* (2006.01)
*F02M 35/10* (2006.01)

(52) U.S. Cl.
CPC ............ *F02M 35/10275* (2013.01); *F02M 35/10118* (2013.01); *F02M 35/10163* (2013.01);
(Continued)

(58) Field of Classification Search
CPC ....... F02M 35/10275; F02M 35/10118; F02M 35/10163; F02M 35/10229; Y10T 137/7754; Y10T 137/7839; Y02T 10/144
(Continued)

(56) References Cited

U.S. PATENT DOCUMENTS 2,037,884 A 4/1936 Day
2,626,009 A 1/1953 Sebok et al.
(Continued)

FOREIGN PATENT DOCUMENTS

CN 2400655 10/2000
CN 2636018 8/2004
(Continued)

OTHER PUBLICATIONS

CN, English Translation of Office Action; Chinese patent application No. 201580000496.5, (00935CN), 5 pages (dated Dec. 23, 2016).
(Continued)

*Primary Examiner* — Craig Schneider
*Assistant Examiner* — P. Macade Nichols
(74) *Attorney, Agent, or Firm* — FisherBroyles, LLP; Susan M. Oiler

(57) ABSTRACT

Check valves, Venturi devices and engines that include the check valves are disclosed. The check valves define an internal cavity having a first port and a second port, a first seat and a second seat, and a translatable seal disk. The first seat is proximate the first port and has a first annular seal bead, and a second annular seal bead radially inward from the first annular seal bead. The seal disk has a first sealing portion seatable against the first annular seal bead and a second sealing portion seatable against the second annular seal bead (both of a first thickness), an intermediate portion between the first and second sealing portions of a second
(Continued)

thickness, and a lip portion defining the outer periphery of the seal disk of a third thickness. The second thickness is greater than the first thickness, and the third thickness is less than the first thickness.

22 Claims, 20 Drawing Sheets

Related U.S. Application Data

(60) Provisional application No. 61/975,542, filed on Apr. 4, 2014.

(52) U.S. Cl.
CPC ...... *F02M 35/10229* (2013.01); *Y02T 10/144* (2013.01); *Y10T 137/7754* (2015.04); *Y10T 137/7839* (2015.04)

(58) Field of Classification Search
USPC .......................... 137/843, 854, 512.15, 526
See application file for complete search history.

(56) References Cited

U.S. PATENT DOCUMENTS

| | | | |
|---|---|---|---|
| 2,905,268 A | 9/1959 | McMichael | |
| 2,954,091 A | 9/1960 | McMichael | |
| 3,430,437 A | 3/1969 | Saussele et al. | |
| 3,581,850 A | 6/1971 | Jaitl | |
| 3,698,510 A | 10/1972 | Blatt et al. | |
| 3,826,281 A | 7/1974 | Clark | |
| 3,842,932 A | 10/1974 | Gibel | |
| 4,215,717 A | 8/1980 | Trosch | |
| 4,354,492 A | 10/1982 | McPhee | |
| 4,424,883 A | 1/1984 | Musiani | |
| 4,683,916 A | 8/1987 | Raines | |
| 4,893,654 A | 1/1990 | Feuz | |
| 4,938,309 A | 7/1990 | Emdy | |
| 4,951,708 A | 8/1990 | Miller | |
| 4,958,661 A * | 9/1990 | Holtermann | F16K 15/141 137/843 |
| 5,108,266 A | 4/1992 | Hewitt | |
| 5,291,916 A | 3/1994 | Kloosterman et al. | |
| 5,326,942 A | 7/1994 | Schmid | |
| RE37,090 E | 3/2001 | Kloosterman et al. | |
| 7,029,103 B2 | 4/2006 | Iida | |
| 7,610,140 B2 | 10/2009 | Hirooka | |
| 7,628,170 B2 | 12/2009 | Kok-Hiong et al. | |
| 7,673,653 B2 | 3/2010 | Mijers et al. | |
| 8,162,006 B2 | 4/2012 | Guala | |
| 8,517,056 B2 | 8/2013 | Cullin | |
| 2002/0027041 A1 | 3/2002 | Czabala et al. | |
| 2005/0045417 A1 | 3/2005 | Ni | |
| 2005/0061378 A1 | 3/2005 | Foret | |
| 2005/0121084 A1 | 6/2005 | Andersson | |
| 2006/0016477 A1 | 1/2006 | Zaparackas | |
| 2006/0144453 A1 | 7/2006 | Steele | |
| 2007/0163664 A1 | 7/2007 | Mijers et al. | |
| 2008/0145238 A1 | 6/2008 | Shibayama et al. | |
| 2011/0132311 A1 | 6/2011 | Pursifull et al. | |
| 2011/0186151 A1 | 8/2011 | Sparazynski | |
| 2012/0024249 A1 | 2/2012 | Fuhrmann et al. | |
| 2013/0139911 A1 | 6/2013 | Wilson et al. | |
| 2013/0213510 A1 | 8/2013 | Burnham et al. | |
| 2014/0014080 A1 | 1/2014 | Beshay et al. | |
| 2014/0165962 A1 | 6/2014 | Pursifull | |
| 2015/0204452 A1 | 7/2015 | Fletcher et al. | |
| 2015/0285401 A1 | 10/2015 | Niedert et al. | |

FOREIGN PATENT DOCUMENTS

| | | |
|---|---|---|
| CN | 201377408 Y | 1/2010 |
| CN | 201907500 | 7/2011 |
| EP | 3442582 A1 | 8/1991 |
| JP | 2009168134 | 7/2009 |
| WO | 2007/050011 A1 | 5/2007 |
| WO | 2008/014306 A2 | 1/2008 |

OTHER PUBLICATIONS

CN, Office Action with English translation; Chinese Patent Application No. 201480001422.9; 19 pages (dated Feb. 16, 2017).
EP, Extended European Search Report; Patent Application No. 14852220.4, Applicant Dayco IP Holdings, LLC, 6 pages (dated May 10, 2017).
CN, Search Report with English translation; Chinese patent application No. 201580000496.5, (00935CN), 4 pages (dated Dec. 14, 2016).
CN, Office Action; Chinese patent application No. 201580000496.5, (00935CN), 5 pages (dated Dec. 23, 2016).
US, Non-Final Office Action; U.S. Appl. No. 14/678,106; (00935US), 12 pages (dated Jan. 20, 2017).
PCT, International Search Report and Written Opinion, Application No. PCT/US2014/059672 (dated Jan. 9, 2015).
PCT, International Search Report and Written Opinion, Application No. PCT/US2015/024195 (dated Jul. 24, 2015).
PCT, International Search Report and Written Opinion, Application No. PCT/US2015/033079 (dated Aug. 21, 2015).
PCT, International Search Report and Written Opinion, Application No. PCT/US2015/039950 (dated Oct. 5, 2015).
U.S., Non-Final Office Action; U.S. Appl. No. 14/565,075; (dated Nov. 16, 2015).
U.S., Non-Final Office Action; U.S. Appl. No. 14/509,612; (dated Dec. 18, 2015).
U.S., Final Office Action; U.S. Appl. No. 14/565,075; (dated Apr. 1, 2016).
U.S., Final Office Action; U.S. Appl. No. 14/509,612; (dated Jun. 22, 2016).
U.S., Non-Final Office Action; U.S. Appl. No. 14/565,075; (dated Jul. 21, 2016).
CN, Search Report with English translation; Chinese Patent Application No. 201480001422.9; (dated Jul. 20, 2016).
CN, Office Action with English translation; Chinese Patent Application No. 201480001422.9; (dated Aug. 1, 2016).
U.S., Final Office Action; U.S. Appl. No. 14/600,598; (dated Aug. 19, 2016).
English translation of JP 07-117010, accessed Nov. 9, 2015, <https://www4.j-platpat.inpit.go.jp/cgi-bin/tran_web_cgi_ejje?u=http://www4.j-platpat.inpit.go.jp/eng/translation/20151110030429332207917469240101009​32AF2D1BD4629B19B-03A22964BC2FC8>.
International Search Report and Written Opinion issued in PCT/US2017/032837 dated Aug. 10, 2017, Applicant Dayco IP Holdings, LLC (8 pages).
U.S., Advisory Action; U.S. Appl. No. 14/509,612; (dated Sep. 1, 2016).
U.S., Notice of Allowance; U.S. Appl. No. 14/509,612; (dated Oct. 17, 2016).

* cited by examiner

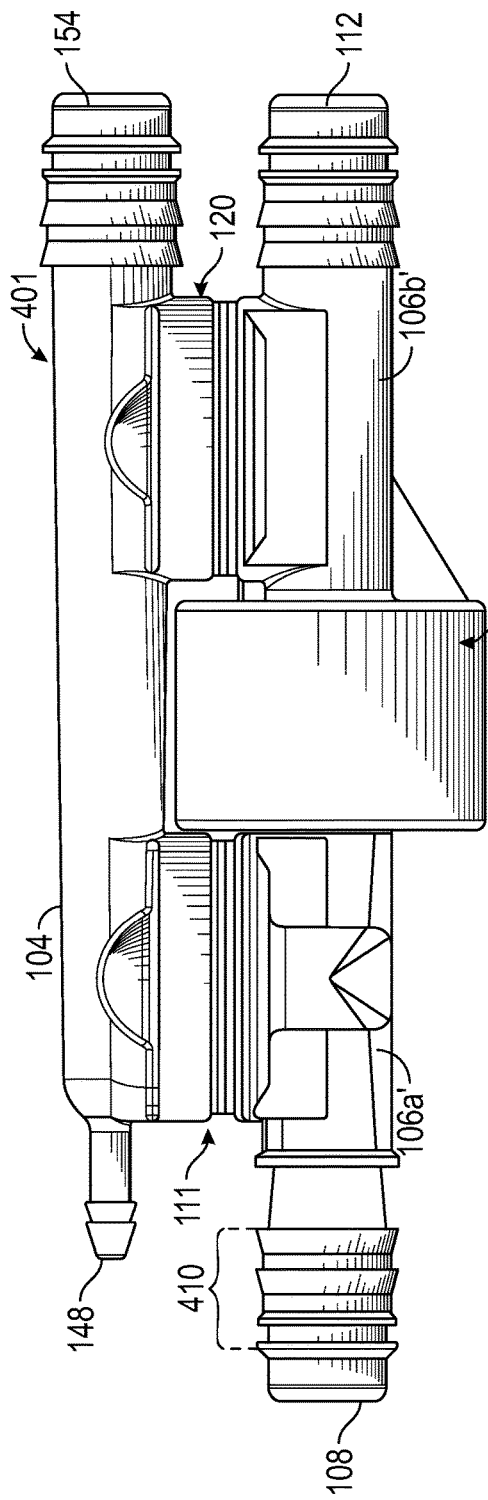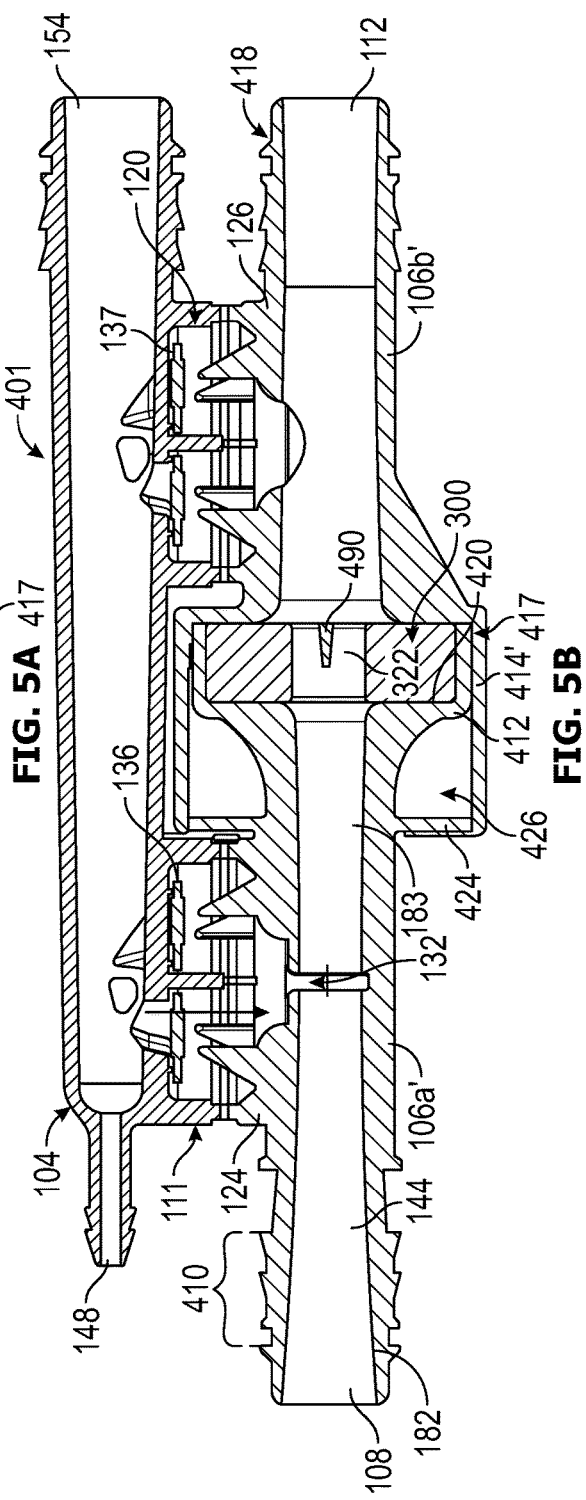

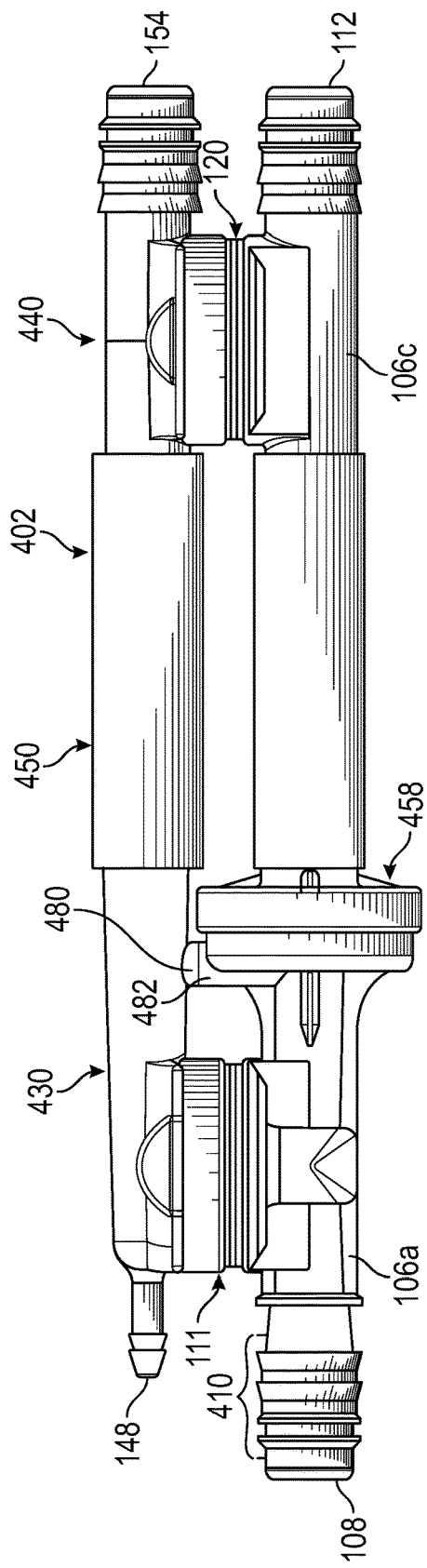

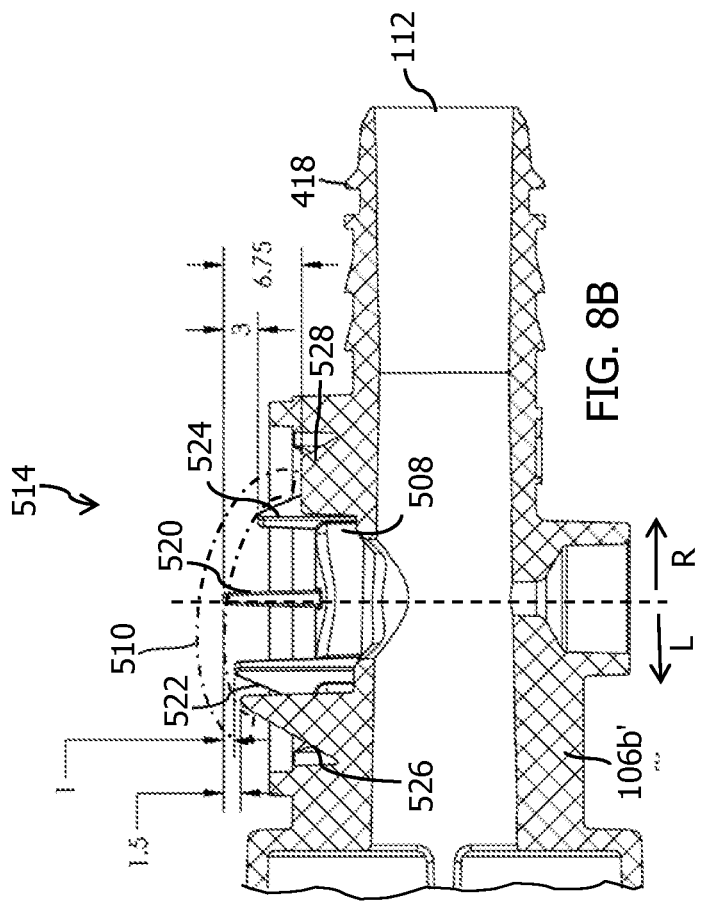

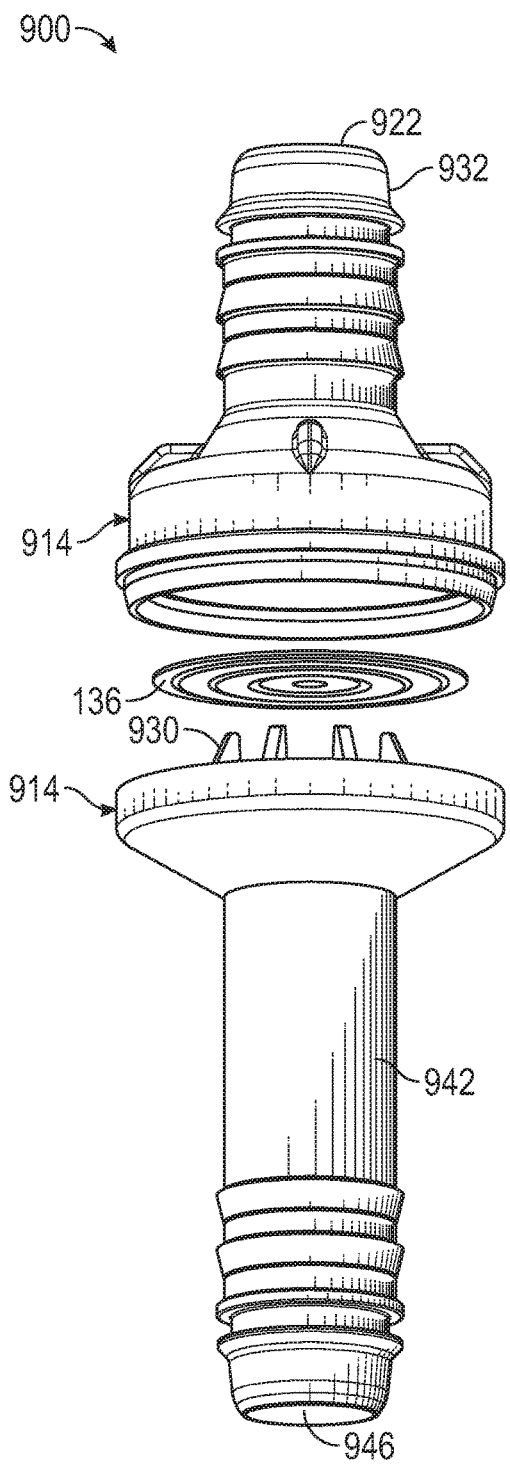
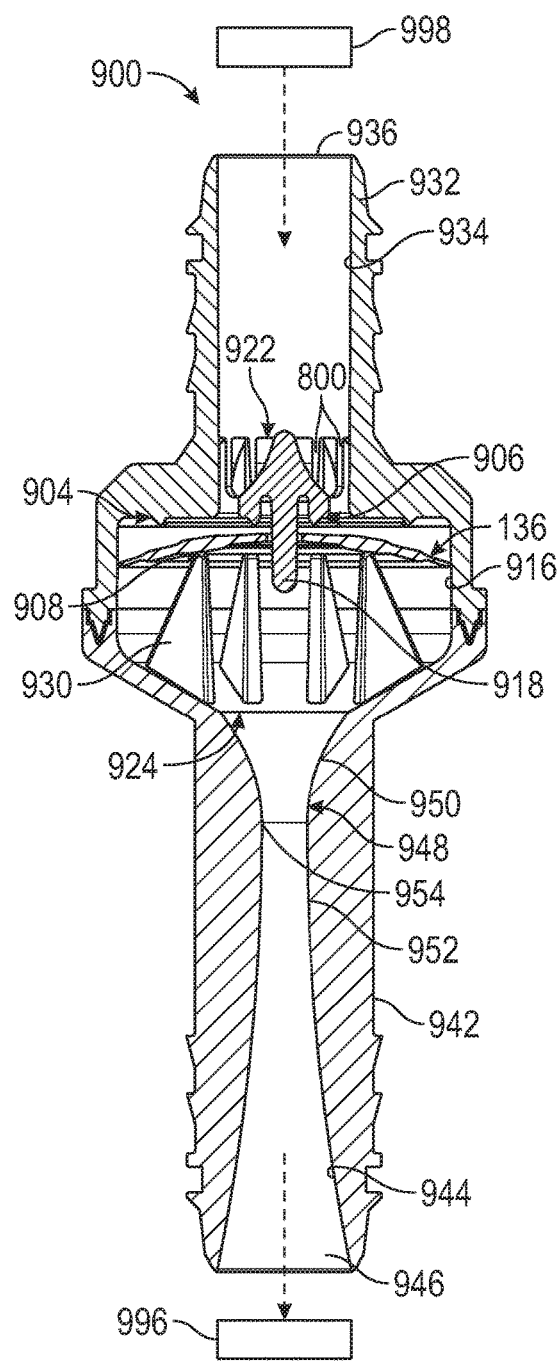
FIG. 23
FIG. 24

US 10,107,240 B2

CHECK VALVES AND VENTURI DEVICES HAVING THE SAME

RELATED APPLICATIONS

This application is a continuation-in-part of U.S. application Ser. No. 14/678,106, filed Apr. 3, 2015, which claims the benefit of U.S. Provisional Application No. 61/975,542, filed Apr. 4, 2014.

TECHNICAL FIELD

This application relates to check valves, in particular check valves having a stepped longitudinal cross section profile included in a Venturi device for producing vacuum.

BACKGROUND

Engines, for example vehicle engines, have included aspirators and/or check valves for a long time. Typically, the aspirators are used to generate a vacuum that is lower than engine manifold vacuum by inducing some of the engine air to travel through a Venturi gap. The aspirators may include check valves therein or the system may include separate check valves.

Good flow performance of a check valve includes quick response, opening against a small pressure difference, closing against a small pressure difference, and low resistance to flow over all operating temperatures. Depending on the combination of operating temperatures, material for the check valve, and the pressure differential acting on the check valve, the sealing member will contact a variety of features in the open position and the closed position, and experience stress as a result thereof. This stress can, over time and variation in operating conditions, cause degradation of the surface of the sealing member and/or internal failure of the sealing member. Improvements are needed for check valves under operating conditions that induce high forces onto the check valve as a result of the pressure differences across it to extend the life of the sealing member and the overall life of the check valve.

BRIEF DESCRIPTION OF THE DRAWINGS

FIG. 5A is a side, perspective view of a third embodiment of an aspirator for attenuating noise from turbulent air flow.

FIG. 5B is a side, longitudinal cross-sectional plan view of the aspirator of FIG. 5A.

FIG. 6A is a side, perspective view of a fourth embodiment of an aspirator for attenuating noise from turbulent air flow.

FIG. 6B is a side, longitudinal cross-sectional plan view of the aspirator of FIG. 6A.

FIGS. 8A and 8B are end perspective and side plan views, respectively, of the lower valve seat portion of the bypass check valve shown in FIG. 7.

FIG. 23 is a check valve having the stepped disk of FIG. 11 and a restrictor profile in the discharge passageway.

FIG. 24 is a longitudinal, cross-sectional view of the check valve of FIG. 23.

DETAILED DESCRIPTION

Figure 1:
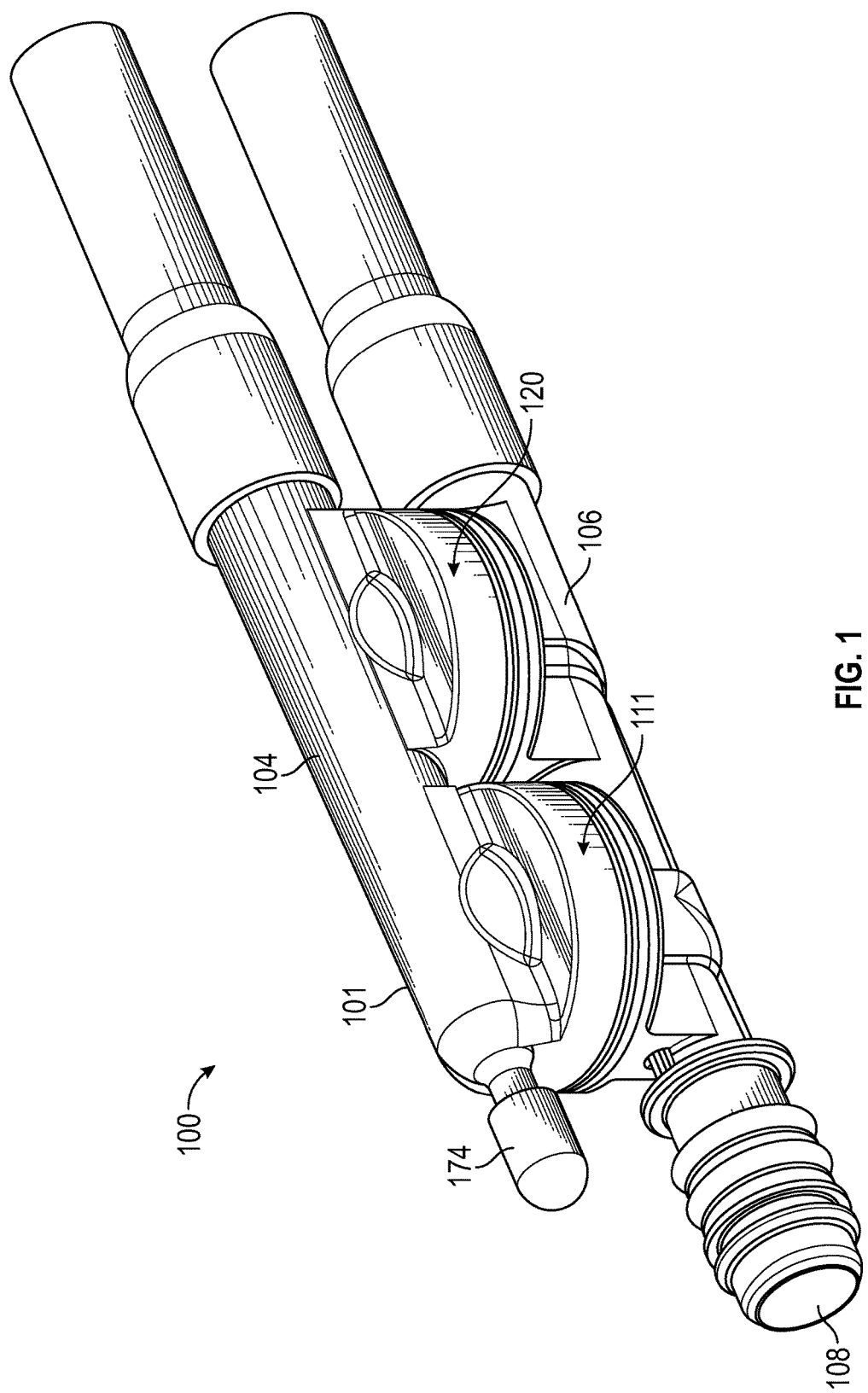
FIG. 1 is a side, perspective view of a first embodiment of an aspirator for attenuating noise from turbulent air flow.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

FIG. 1 is an external view of an aspirator-check valve assembly, generally identified by reference number 100, for use in an engine, for example, in a vehicle's engine. The engine may be an internal combustion, and the vehicle and or engine may include a device requiring a vacuum. Check valves and or aspirators are often connected to an internal combustion engine before the engine throttle and after the engine throttle. The engine and all its components and/or subsystems are not shown in the figures, with the exception of a few boxes included to represent specific components of the engine as identified herein, and it is understood that the engine components and/or subsystems may include any commonly found in vehicle engines. While the embodiments in the figures are referred to as aspirators herein because the motive port 108 is connected to atmospheric pressure, the embodiments are not limited thereto. In other embodiments the motive port 108 may be connected to boosted pressure, such as the pressures attributed to boosted air produced by a turbocharger and as such the "aspirator-check valve assembly" is now preferably referred to as an ejector, or generically both may be referred to as Venturi devices.

Figure 2:
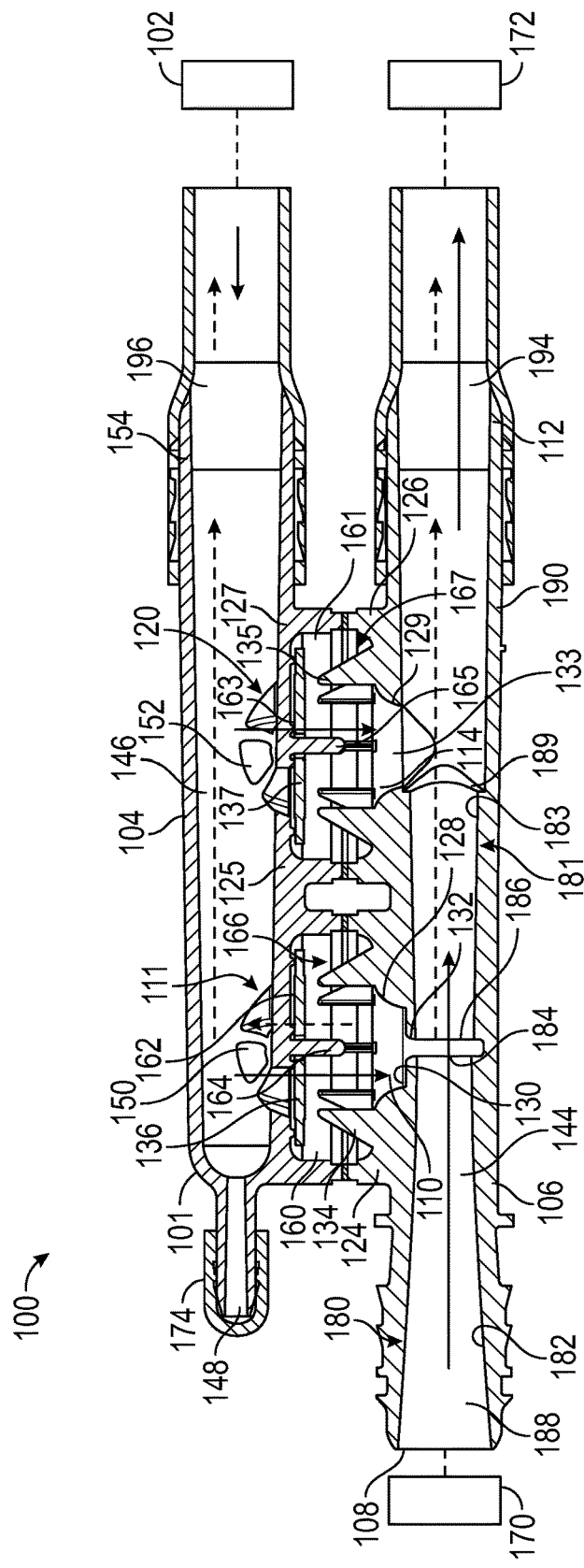
FIG. 2 is a side, longitudinal cross-sectional plan view of the aspirator of FIG. 1.

The aspirator-check valve assemblies disclosed herein may have alternate embodiments such as the embodiment of FIGS. 1 and 2, FIGS. 3A and 3B, FIGS. 5A and 5B, FIGS. 6A and 6B, and FIG. 7. Each aspirator-check valve assembly, as represented in FIG. 2, is connectable to a device requiring a vacuum 102 and creates vacuum for said device 102 by the flow of air through a passageway 144, extending generally the length of a portion of the aspirator-check valve assembly, designed to create the Venturi effect. The aspirator-check valve assemblies include housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 1-2, the lower housing portion 106 defines passageway 144 which includes a plurality of ports, some of which are connectable to components or subsystems of the engine. The ports include: (1) a motive port 108, which supplies clean air from the engine intake air cleaner 170, typically obtained upstream of the throttle of the engine, when used as an aspirator; (2) a suction port 110, which can connect via the check valve 111 to a device requiring vacuum 102; (3) a discharge port 112, which is connected to an engine intake manifold 172 downstream of the throttle of the engine; and, optionally, (4) a bypass port 114. Check valve 111 is preferably arranged to prevent fluid from flowing from the suction port 110 to the application device 102. In one embodiment, the device requiring vacuum 102 is a vehicle brake boost device, but is not limited thereto. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

As shown in FIG. 2, lower housing portions 106 in both embodiments includes lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126 to allow for air flow communication with air passageway 144. In FIG. 2, each lower valve seat 124, 126 includes a plurality of radially spaced fingers 134, 135 extending upwardly from an upper surface thereof. The radially spaced fingers 134, 135 serve to support a seal member 136, 137.

Referring again to FIGS. 1-2, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 in fluid communication with the suction port 110 in the lower housing portion 106, and between which the seal member 136 is disposed; (3) a third port 152 in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIG. 2, the upper housing portion 104 in both embodiments includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the seal members 136, 137 within the cavities 166, 167 defined by the mated upper valve seat 125 with the lower valve seat 124 and defined by the mated upper valve seat 127 with the lower valve seat 126. Accordingly, each seal member 136, 137 includes a bore therethrough sized and positioned therein for receipt of the pin 164,165 within its respective cavity 166, 167.

Referring again to FIG. 2, the passageway 144 in the lower housing portion 106 has an inner diameter along a central longitudinal axis B (labeled in FIG. 7) that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet end 184, 189 may be any circular shape, ellipse shape, or some other polygonal form and the gradually, continuously tapering inner diameter extending therefrom may define, but is not limited to, a hyperboloid or a cone. Some example configurations for the outlet end 184 of the motive section 180 and inlet end 186 of the discharge section 181 are presented in FIGS. 4-6 of co-pending U.S. patent application Ser. No. 14/294,7276, filed Jun. 3, 2014, incorporated by reference herein in its entirety.

As seen in FIG. 2, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182, 183 typically share the central longitudinal axis B of the lower housing portion 106.

Still referring to FIG. 2, the inner dimension of the second tapering portion 183 tapers gradually, continuously from a smaller inlet end 186 to a larger outlet end 189. This inner dimension may be any circular shape, ellipse shape, or some other polygonal form, including but not limited to a hyperboloid or a cone. The optional bypass port 114 may intersect the discharge section 190 as described above to be in fluid communication with the second tapering section 183. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner diameter until it terminates at the discharge port 112. Each of the respective ports 108, 110, 112, and 114 may include a connector feature on the outer surface thereof for connecting the passageway 144 to hoses or other features in the engine.

When the aspirator-check valve assembly 100 is connected into an engine system, for example as illustrated in FIG. 2, the check valves 111 and 120 functions as follows. As the engine operates, the intake manifold 172 draws air into the motive port 180, through passageway 144 and out the discharge port 112. This creates a partial vacuum in the check valves 111, 120 and passageway 146 to draw seal members 136, 137 downward against the plurality of fingers 134, 135. Due to the spacing of fingers 134, 135 free fluid flow from passageway 144 to passageway 146 is allowed. The partial vacuum created by the operation of the engine serves in the vacuum assistance of at least the operation of the device requiring vacuum 102.

The fluid flow within the aspirator-check valve assemblies described above is generally classified as turbulent. This means that in addition to the bulk motion of the fluid flow, such as air, there are pressure waves traveling through the assembly and different natural frequencies can become excited thereby resulting in turbulence generated noise. The aspirator-check valve assembly 100 as seen in FIG. 2 include one or more sound attenuating members, 194, 196. The sound attenuating members 194, 196 are placed within the flow path proximate, but downstream of the regions where turbulence generated noise is created. As seen in FIG. 2 the first sound attenuating member 194 is disposed proximate to or in the discharge port 112 because the discharge section 190 is one portion where such noise is created. Also in FIG. 2, the second sound attenuating member 196 is present and is disposed proximate to or in the fourth port 154 of passageway 146 because the flow path between the bypass port 114, check valve 120, and the fourth port 154 is one portion where such noise is created.

The sound attenuating members 194, 196 are porous such that fluid flow through and between the passageways 144, 146 is not restricted, but sound (turbulence generated noise) is attenuated. With reference to FIG. 2, the solid arrows represent the fluid flow within the aspirator-check valve assembly and the dashed arrows represent the path for travel of the turbulence generated noise. As depicted, there are two potential paths for the turbulence generated noise: (1) toward the engine intake manifold 172; and (2) toward, and the device requiring vacuum 102. To eliminate or reduce this noise the porous elements are proximate but downstream of the source of the turbulent noise. For example, the sound attenuating members may be positioned in the discharge port, the suction port, the bypass check valve passageway above the check valve, and or the suction check valve passageway above the check valve.

The check valves 111, 120 can also produce turbulent noise due to the flow therethrough. This noise would travel down either of the two connections. Sound attenuating members may be placed in either the inlet or outlet passageways thereof.

The sound attenuating members 194, 196 are porous as explained above and can be made from a variety of materials including metals, plastics, ceramics, or glass. The sound attenuating members may be made from wire, woven or matted, sintered particles, fibers woven or matted, but are not limited thereto. The porous character of the sound attenuating members causes the noise pressure waves to attenuate by interfering with themselves, but should be of sufficient size and shape to not unduly restrict fluid flow. In one embodiment, the sound attenuating members 194, 196 are not harmed (do not deteriorate) by operating temperatures of an engine based on placement of the aspirator in the engine system. Additionally, the sound attenuating members 194, 196 are not harmed by the vibrations experienced during operating conditions of the engine.

Figure 3A:
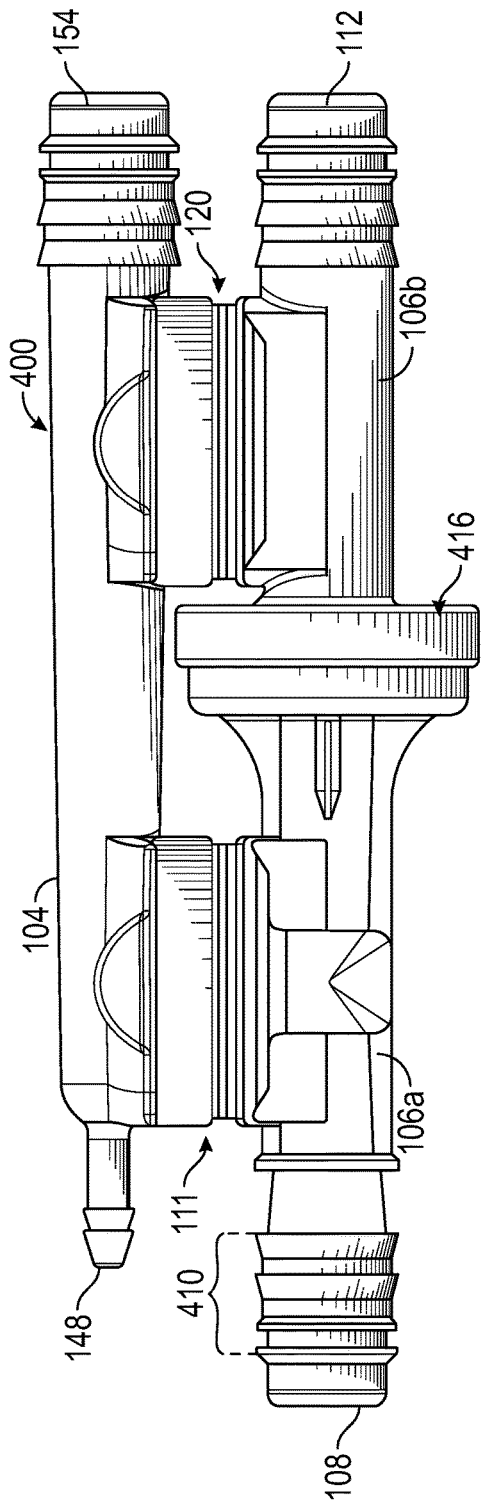
FIG. 3A is a side, perspective view of a second embodiment of an aspirator for attenuating noise from turbulent air flow.
Figure 3B:
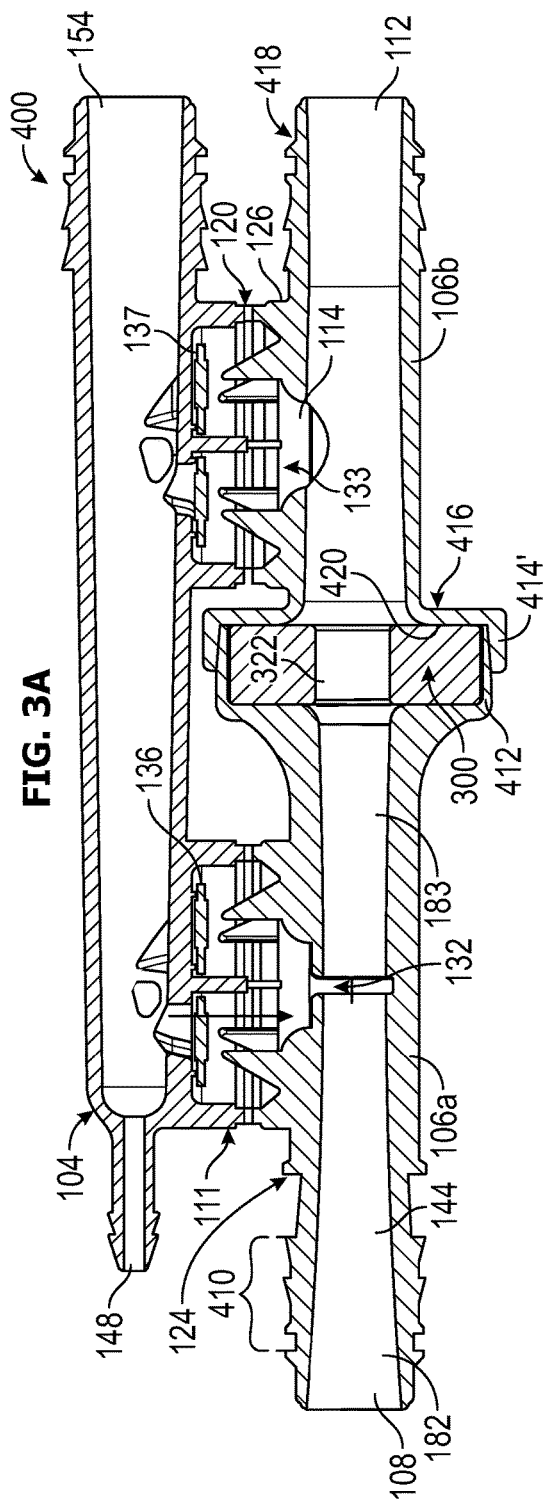
FIG. 3B is a side, longitudinal cross-sectional plan view of the aspirator of FIG. 3A.

The embodiments depicted in FIGS. 3A and 3B, 5A and 5B, and 6A and 6B are alternate embodiments of aspirators 400, 401, and 402, respectively. Reference numbers identifying similar or the same components as described for FIGS. 1-2 are used in these figures as well. Each of these aspirators 400, 401, 402 include a porous sound attenuating member 300 within passage way 144 downstream of the bore 132 of a Venturi portion and disposed in the discharge section 181. So, as seen in FIGS. 3B, 5B, and 6B, the sound attenuating member 300 is after the bore 132 and before the bypass port 114. The sound attenuating member is shown to be the sound attenuating member of FIG. 4A, but of course is not limited thereto.

Figure 4C:
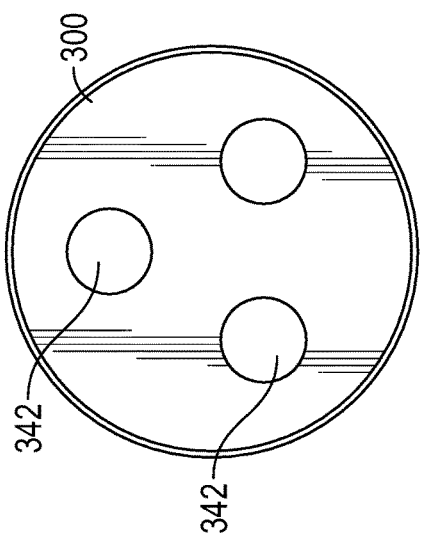
FIG. 4C is a top plan view of another embodiment of a sound attenuating member.
Figure 4B:
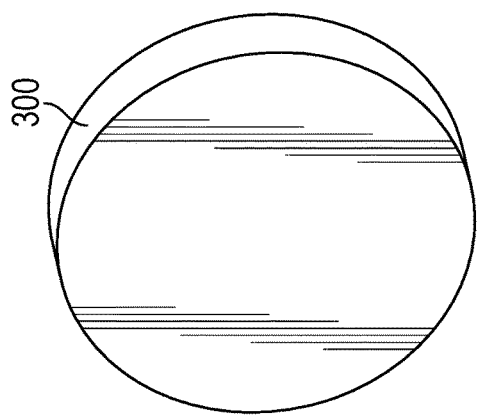
FIG. 4B is a top, perspective view of another embodiment of a sound attenuating member.
Figure 4A:
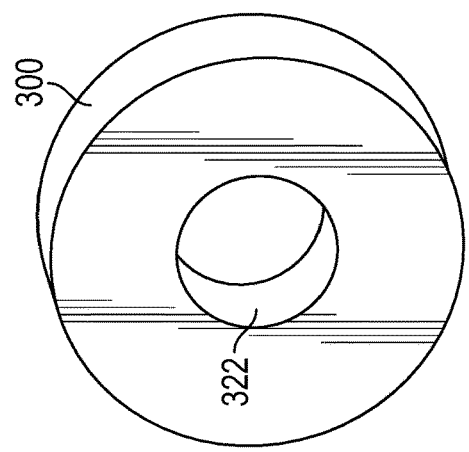
FIG. 4A is a top, perspective view of one embodiment of a sound attenuating member.

As seen in FIGS. 4A and 4C, the porous sound attenuating members, generally represented by reference number 300 in these figures, may include one or more bore holes 322, 342 therethrough. The bore holes provide the benefit of minimizing unwanted bulk flow restriction within any of the embodiments described herein. The bore holes 322, 342 may be circular in cross-section, but are not limited thereto. In another embodiment, the bore holes 322, 342 may be elliptical or polygonal in cross-section. Each bore hole has a generally central axis therethrough that is typically oriented generally parallel to the direction of the flow through the portion of the aspirator where the sound attenuating member 300 is disposed. As seen in FIG. 4A, if a single bore hole 322 is present it may be generally centrally positioned within the sound attenuating member 300, but is not limited thereto. The dimensions of the bore hole 322 are typically smaller than the internal dimensions of the upstream passageway adjacent to the sound attenuating member 300. When the bore hole 322 is circular in cross-section, the diameter of the bore hole 322 may be about 8 mm to about 14 mm. As seen in FIG. 4C, a plurality of bore holes 342 are present and are symmetrically positioned relative to one another within the porous sound attenuating member 300. These bore holes 342 may be circular in cross-section as shown, but are not limited thereto and may also be non-symmetrically arranged is desired. As described for FIG. 4A, here also the dimensions of the bore holes 342 are smaller than the internal dimensions of the upstream passageway adjacent to the sound attenuating member 300. When bore holes 342 are circular in cross-section, the diameter of each may be about 3 mm to about 5 mm.

However, in an alternate embodiment, as seen in FIG. 4B, any of the porous sound attenuating members in the embodiments described herein may be a continuous plug of porous material with the only passageways therethrough being channels defined by its natural porosity, i.e., no enlarged bore holes are present. The continuous plug may be any shape and configuration to fit within the selected portion of the check valve or aspirator, but as illustrated may be disc-shaped.

The embodiment of FIGS. 3A and 3B has three primary housing pieces: (1) the upper housing portion 104 as described above and the lower housing portion 106 described above, but split into a (2) Venturi portion 106*a* and (3) a bypass portion 106*b*. The Venturi portion 106*a* includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. The bypass portion 106*b* includes a second canister portion 414 mateable with the first canister portion 412 to enclose the sound attenuating member 300 in an enclosed chamber 420 defined by canister 416 formed when the first and second canister portions 412, 414 are mated together. The bypass portion also include a bypass port 114 and the lower half of the check valve 120, specifically the lower seat 126, and discharge port 112 that may include a hose connector 418 on the outer exterior surface defining the discharge part 112.

When the upper housing portion 104 and the Venturi portion 106*a* and the bypass portion 106*b* are assembled, a first seal member 136 is seated in check valve 111 and a second seal member 137 is seated in check valve 120.

The embodiment of FIGS. 5A and 5B similar to the embodiment of FIGS. 3A and 3B has three primary housing pieces: (1) the upper housing portion 104, and the lower housing portion 106 described above, but split into a (2) Venturi portion 106*a*' and (3) a bypass portion 106*b*'. The Venturi portion 106*a*' is the same as disclosed in FIG. 5B except that upstream of where the discharge cone 183 terminates in a first canister portion 412 a collar 424 extends radially outward from the exterior surface of the discharge cone 183. As seen in FIG. 5B the collar 424 is positioned between the bore 132 and the first canister portion 412. The bypass portion 106*b*' is the same as disclosed in FIG. 3B except that the second canister portion 414' is configured to extend beyond the first canister portion 412 to mate to or be coupled to the collar 424. When the first canister portion 412 and the second canister portion 414' are mated together they enclose a sound attenuating member 300 therebetween in an enclosed chamber 420' and also form a second chamber 426 located between the collar 424 and the first canister portion 412. When assembled, the canister 417 is dual chambered having the second chamber 426 surrounding the outside of the discharge cone 183 upstream from the first chamber 420 housing the sound attenuating member 300. FIG. 3B, the second chamber 426 contains air and may be sealed to contain the air or may be in fluid communication with ambient air surrounding the aspirator 401. In another embodiment (not shown), the second chamber 426 may include a second sound attenuating member, which may be a porous material that does or does not include bore holes such as those shown in FIGS. 4A and 4C. When assembled, the aspirator 401 also includes, a first seal member 136 seated in check valve 111 between the upper housing portion 104 and the Venturi portion 106*a*' and a second seal member 137 seated in check valve 120 between the upper housing portion 104 and the bypass portion 106*b*'.

The embodiment of FIGS. 6A and 6B is essentially the embodiment of FIGS. 3A and 3B, but divided into two subassemblies 430, 440, one of which includes a sound attenuating canister 458, joinable into fluid communication by one or more hoses 450. The embodiment of FIGS. 5A and 5B could also be divided into two subassemblies as well in a similar fashion even though not illustrated in the figures. The subassemblies include a Venturi subassembly 430 and a bypass subassembly 440.

The Venturi subassembly 430 includes a first upper housing portion 432 that includes the upper valve seat 125 as described above and a lower Venturi portion 106*a* as described in FIG. 3B, which terminates with a first canister portion 412. When the first upper housing portion 432 is mated to the lower Venturi portion 106*a*, a first seal member 136 is seated between the upper valve seat 125 and the lower valve seat 126 to form check valve 111. The Venturi portion 106*a* includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. Connectable to the lower Venturi portion 106*a* is a canister cap 460 comprising a second canister portion 462 and a connector portion 464 having hose connecting features 466 on its exterior surface. The second canister portion 462 is mateable with the first canister portion 412 to enclose the sound attenuating member 300 in an enclosed chamber 470 formed therebetween when the first and second canister portions 412, 414 are mated together.

As illustrated in FIGS. 6A and 6B, the first upper housing 430 may include a first stabilizing member 480 facing the lower Venturi portion 106*a* and positioned to mate with a second stabilizing member 482 included as part of the lower Venturi portion 106*a*. The assembled aspirator 402 has the first stabilizing member 480 mated with the second stabilizing member 482 to stiffen and strengthen the aspirator, in particular the half of the aspirator having the sound attenuating canister 458.

The bypass subassembly 440 includes a second upper housing portion 434 and a lower bypass portion 106*c*. The second upper housing portion 434 includes an upper valve seat 125 defining, as described above, a portion of check valve 120 and the third port 152, which is in fluid communication with the bypass port 114 in the lower bypass housing portion 106*c*. The second upper housing portion 434 also includes a conduit 472 having a fifth port 474 connectable to a sixth port 436 of the first upper housing portion 432 by a hose 450. The upper bypass housing portion 434 also includes the fourth port 154, described above, which may function as an inlet connecting the aspirator-check valve assembly 402 to a device requiring vacuum. The lower bypass housing portion 106*c* includes the bypass port 114, the lower half of the check valve 120, specifically the lower valve seat 126, and the discharge port 112 that may include a hose connecting features 418 on its outer exterior surface.

Through numerous tests of the various embodiments disclosed above, it was noticed that the seal member 137 in the bypass check valve 120 would move to the closed position in a generally uneven manner. In particular, a first portion of the seal member 137 most proximate to the discharge port 112 would move to the closed position first, and then, a second portion opposite thereof would move to the closed position. This problem is solved by bypass check valve 501 in the embodiment disclosed in FIG. 7 through a change in the configuration of the second seat 514, best seen in FIGS. 8A and 8B, by providing the second portion of the seal member 137, which would otherwise lag behind in the prior embodiments, a shorter distance to travel to reach the closed position, i.e., when the pressure in cavity 154 is less than the pressure at the discharge port 112. Accordingly, the bypass check valve is less likely to have the seal member stuck with the first portion of the seal member seated against the first seat in a closed position while the second portion is not seated thereagainst, i.e., not sealed in the closed position. The bypass check valve 501 in FIG. 7 operates such that the first and second portions of the seal member 510 are seated against first seat (the closed position shown in FIG. 7) closer in time to one another, and, ideally, generally simultaneously. An addition benefit of the bypass check valve 501 is that in the open position, with the second seal member 510 seated against the second seat 514, there is improved fluid flow past the seal member.

Figure 7:
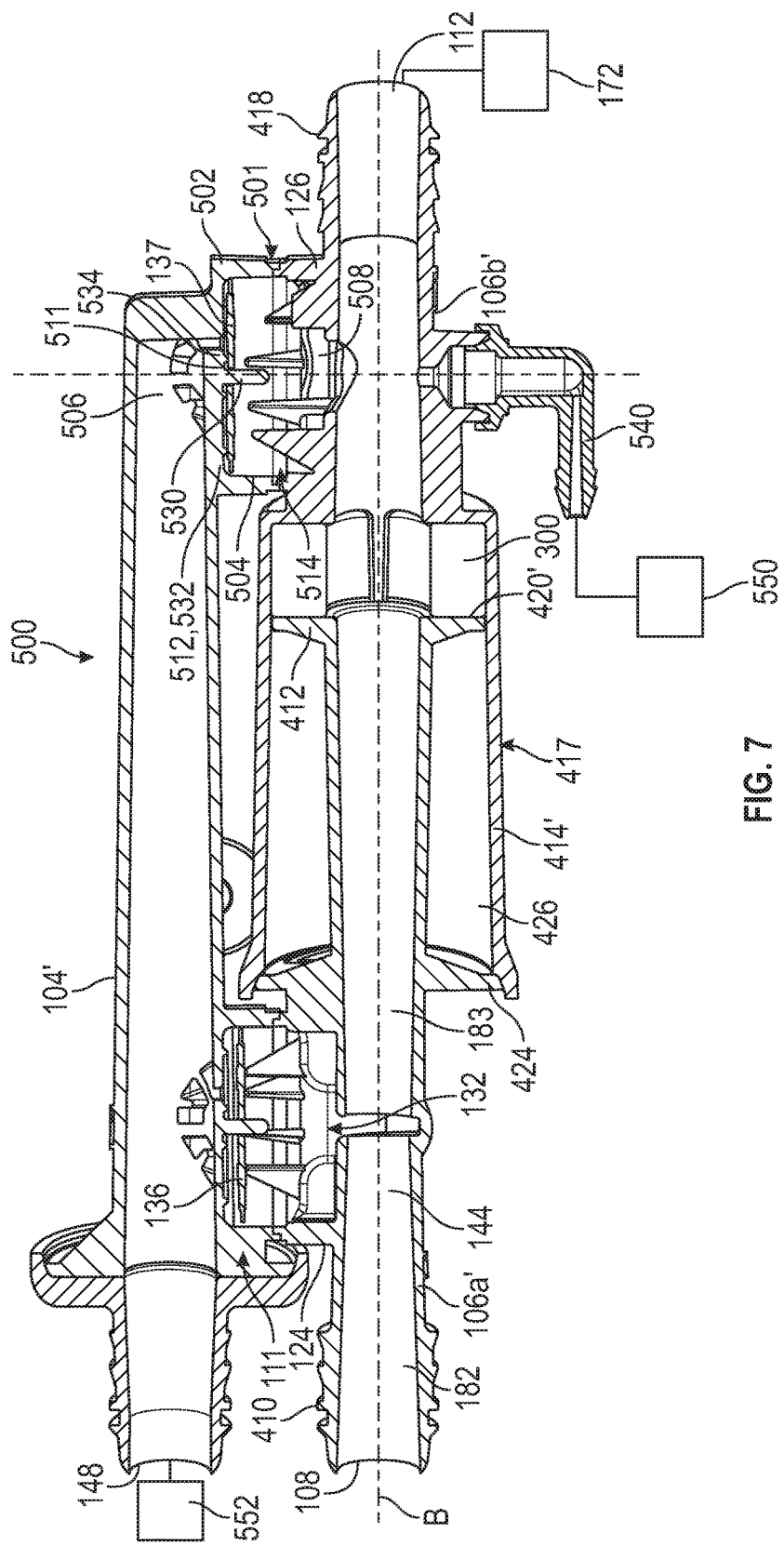
FIG. 7 is a side, longitudinal cross-sectional plan view of a fifth embodiment of an aspirator for attenuating noise from turbulent flow that includes an improved bypass check valve.

The embodiment of FIG. 7 is similar to the embodiment of FIGS. 5A and 5B in that the aspirator 500 has three primary housing pieces: (1) the upper housing portion, designated as 104' in this embodiment, and the lower housing portion 106 described above, but split into a (2) Venturi portion 106a' and (3) a bypass portion 106b'. The Venturi portion 106a' is generally the same as disclosed in FIG. 5B, i.e., upstream of where the discharge cone 183 terminates in a first canister portion 412 that includes a collar 424 extending radially outward from an exterior surface of the discharge cone 183. The collar 424 is positioned between the bore 132 and the first canister portion 412.

Still referring to FIG. 7, the bypass portion 106b' is similar to that disclosed in FIGS. 5A and 5B in that the second canister portion 414' is configured to extend beyond the first canister portion 412 to mate to or be coupled to the collar 424, but differs in that rather than having a fourth port as part of the upper housing portion 104' it is positioned below the bypass port 508 as auxiliary port 540. When the first canister portion 412 of the Venturi portion 106a' and the second canister portion 414' of the bypass portion 106b' are mated together they enclose a sound attenuating member 300 therebetween in an enclosed chamber 420' and also forms a second chamber 426 located between the collar 424 and the first canister portion 412. When assembled, the canister 417 is dual chambered having the second chamber 426 surrounding the outside of the discharge cone 183 upstream from the first chamber 420, which houses the sound attenuating member 300. The second chamber 426 may contain air and may be sealed to contain the air or may be in fluid communication with ambient air surrounding the aspirator 500. In another embodiment (not shown), the second chamber 426 may include a second sound attenuating member, which may be a porous material that does or does not include bore holes such as those shown in FIGS. 4A and 4C.

When assembled, as seen in FIG. 7, the aspirator 500 also includes, a first seal member 136 seated in check valve 111 between the upper housing portion 104' and the Venturi portion 106a' and a second check valve disc 510 seated in an improved bypass check valve 501 between the upper housing portion 104' and the bypass portion 106b'. The improved check valve 501 has a housing 502 (made up of a portion of the upper housing portion 104' and the lower bypass housing 106b') defining an internal cavity 504 having a first port 506 (inlet) and a second port 508 (outlet) both of which are in fluid communication with the internal cavity 504. The internal cavity 504 has a first seat 512 defining a closed position and a second seat 514 defining an open position. A seal member 137 is seated within the internal cavity 504 and is translatable between the closed position against the first seat 512 and the open position against the second seat 514. In one embodiment, the seal member 137 is generally made of a rigid material and as such is seated against the second seat in an angled position relative to the central longitudinal axis B. In another embodiment, the seal member may be flexible, flexible seal member 510 shown in FIG. 8B, which is deflectable between a flat sealing state (such as shown in FIG. 7) in the closed position and a deflected open state shown in FIG. 8B as an arcuate position against the second seat 514.

Figure 8A:
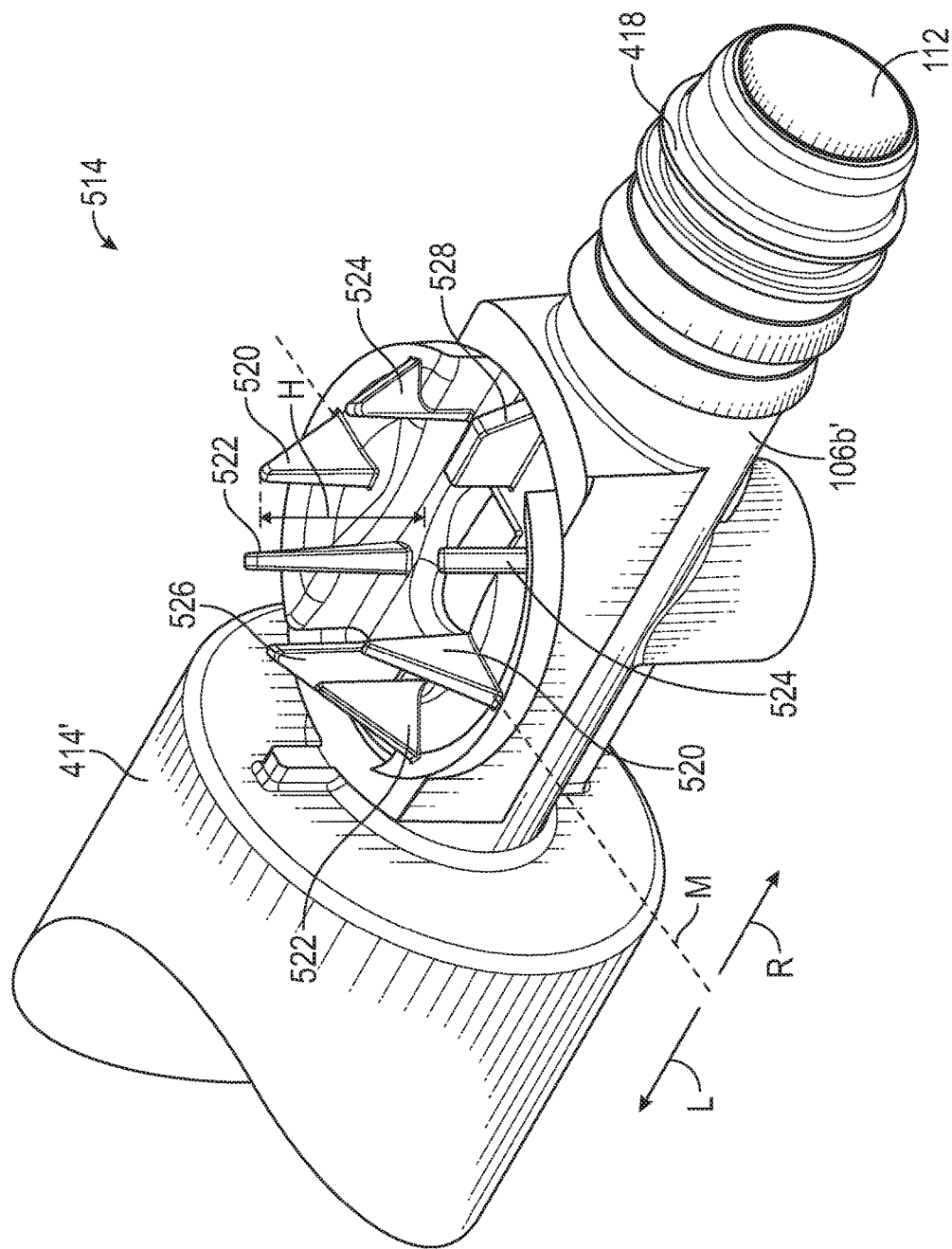

Now referring to FIGS. 8A and 8B, the second seat 514 defines a support structure for the seal member 510 that includes a right side R and a left side L that are both shorter than a middle region M, wherein the right side R is overall shorter than the left side L thereby allowing the seal member 510 to deflect more over the right side R than on the left side L. The middle region M has a height H (FIG. 8A) that positions the seal member 510 closer to the first seat 512 of FIG. 7 than a predetermined distance. The predetermined distance is selected for improved, quicker closing of the check valve and/or allowing a maximum amount of flow through the check valve, and may be about 0.5 mm to about 3 mm, or more preferably about 1 mm to about 2 mm. In one embodiment, the left side L is more proximate the motive port 108 and the right side R is more proximate the discharge port 112. The support structure includes a sufficient number of pathways for fluid to be in fluid communication with the second port 508 after passing through the first port 506 and over and around the seal member 510.

In one embodiment, the support structure of the second seat 514 may include a plurality of fingers 520, 522, 524, 526, 528 extending into the internal cavity 504 that are circumferentially spaced apart about the second port 508. The plurality of fingers may be equidistant apart from one another. The plurality of fingers have differing heights and include at least two diametrically opposed first fingers 520 that define the middle region M, one or more mid-height fingers 522, which are about 70% to about 90% of the total height of the first fingers 520 and define the left side L of the support structure, and one or more shorter fingers 524, which are shorter than the mid-height fingers 522 and define the right side R of the support structure. With this type of support structure for the second seat 514, the seal member 510 deflects sufficiently to permit high bypass flow of fluid from the device requiring vacuum 102 when the pressure in the device requiring vacuum 102 is greater than a manifold pressure of an engine that is fluidly coupled to the discharge port 112 of the aspirator 500 and also provides for quick, more uniform closure of the bypass check valve 501.

The support structure may also include one or more fourth-height fingers 526 that are shorter than the one or more mid-height fingers 522 and are positioned more proximate the motive port 108 than the one or more mid-height fingers 522. The support structure may also include one or more fifth-height fingers 528 that are shorter than the shorter fingers 524 and are positioned more proximate the discharge port 112 than the shorter fingers 524. FIG. 8B includes one example of heights for the plurality of fingers. In this figure, the first fingers 520 are the tallest, the mid-height fingers 522 are 1 mm shorter than the first fingers, the shorter fingers 524 are about 3 mm shorter than the first fingers (about 2 mm shorter than the mid-height fingers), the fourth-height fingers 526 are about 1.5 mm shorter than the first fingers (about 0.5 mm shorter than the mid-height fingers 522), and the fifth-height fingers 528 are about 6.75 mm shorter than the first fingers (about 3.75 mm shorter than the shorter fingers 524).

The seal member 510 may be or includes an elastomeric material suitable for use in the aspirator 500 when connected to the intake manifold 172 of an internal combustion engine, i.e., is durable when exposed to engine temperatures and pressures. In one embodiment, the seal member 510 may be or include one or more of a natural rubber, synthetic rubber, silicone rubber, fluorosilicone rubber, fluorocarbon rubber, nitrile rubber, EPDM, PTFE, and combinations thereof, but is not limited thereto.

As shown in FIG. 7, the housing 502 of the improved bypass check valve 501 includes a pin 530 extending into the internal cavity 504. The seal member 510 includes a bore 511 therethrough and the pin 530 is received therein. The seal member 510 is translatable along the pin. This is merely one non-limiting example of maintaining alignment of the seal member 510 during translation. The first seat 512 within the internal chamber 504 includes a first annular seal bead 532 and may include a second annular seal bead 534 disposed radially inward from the first annular seal bead 532.

Still referring to FIG. 7, as one example embodiment, the discharge port 112 is in fluid communication with an intake manifold of an internal combustion engine, the auxiliary port 540 is in fluid communication with a device 550 that utilizes vacuum, such as a brake system or a four wheel drive system, the motive port 108 is in fluid communication with a source of air, preferably clean air, and the first port 148 is in fluid communication with another device 552 utilizing vacuum such as a brake booster.

Figure 9:
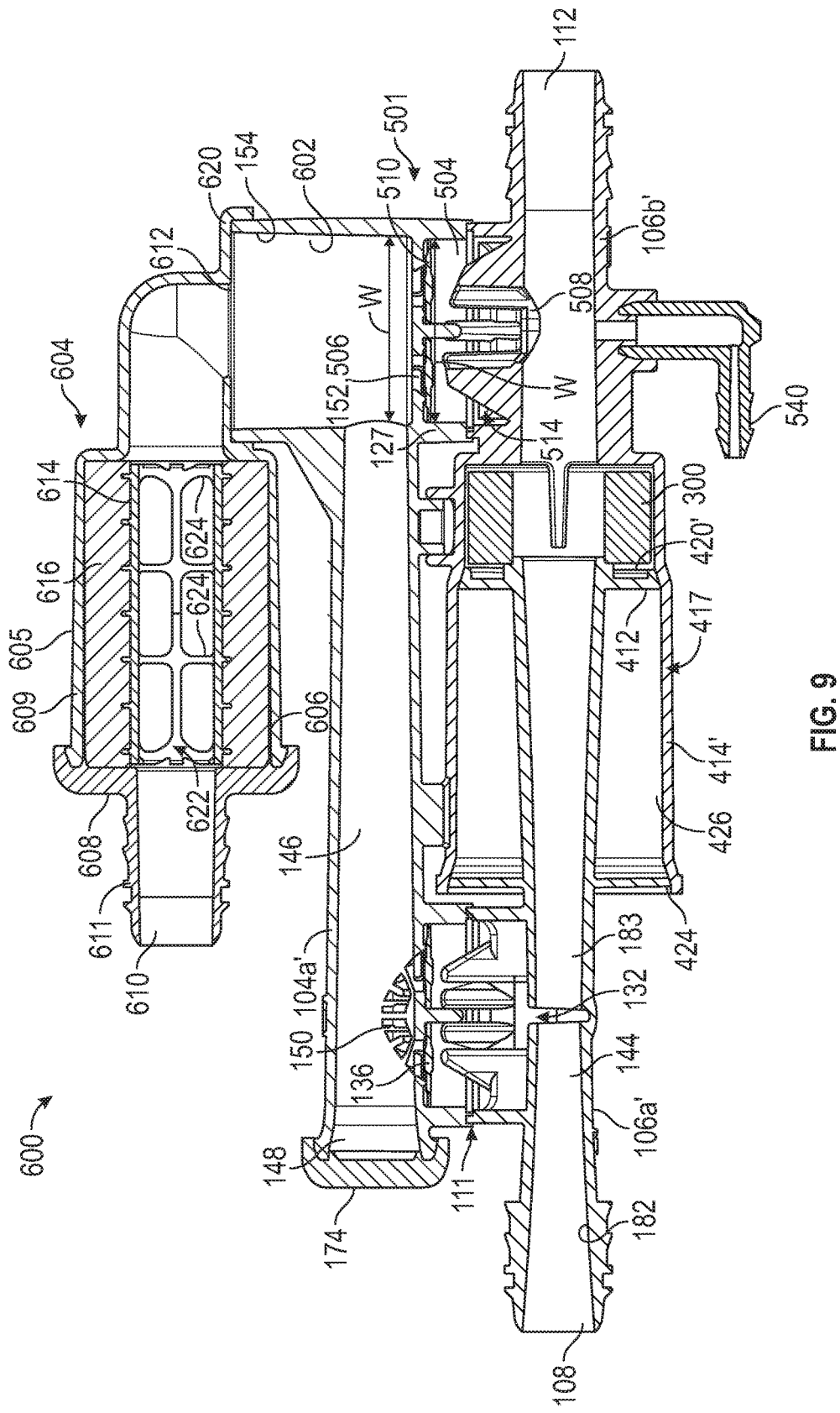
FIG. 9 is a side, longitudinal cross-sectional plan view of a sixth embodiment of an aspirator for attenuating noise from turbulent flow that includes an improved bypass check valve.

Referring now to FIG. 9, the embodiment of the aspirator-check valve assembly is generally designated as 600. This aspirator-check valve assembly 600 is generally similar to the embodiment of FIG. 7 and FIGS. 5A and 5B in that the aspirator 600 has three primary housing pieces: (1) the upper housing portion, designated as 104a' in this embodiment because it has a different configuration where it attaches to the bypass check valve 501; (2) a first portion defining part of the lower housing, referred to as the Venturi portion 106a'; and (3) a second portion defining the other part of the lower housing, referred to as a bypass portion 106b'. The Venturi portion 106a' is generally the same as disclosed in FIGS. 7 and 5B, i.e., upstream of where the discharge cone 183 terminates in a first canister portion 412 that includes a collar 424 extending radially outward from an exterior surface of the discharge cone 183. The collar 424 is positioned between the bore 132 and the first canister portion 412.

The bypass portion 106b' is similar to that disclosed in FIG. 7 in that it defines the second seat 514 having the improved support structure as set forth above, the second canister portion 414' configured to extend beyond the first canister portion 412 to mate to or be coupled to the collar 424 of the Venturi portion 106a', and an auxiliary port 540 in fluid communication with the discharge port 112 and the second port 508 of the bypass check valve 501. When the first canister portion 412 of the Venturi portion 106a' and the second canister portion 414' of the bypass portion 106b' are mated together they enclose a sound attenuating member 300 therebetween in an enclosed chamber 420' and also forms a second chamber 426 located between the collar 424 and the first canister portion 412. When assembled, the canister 417 is dual chambered having the second chamber 426 surrounding the outside of the discharge cone 183 upstream from the first chamber 420, which houses the sound attenuating member 300. The second chamber 426 may contain air and may be sealed to contain the air or may be in fluid communication with ambient air surrounding the aspirator 500. In another embodiment (not shown), the second chamber 426 may include a second sound attenuating member, which may be a porous material that does or does not include bore holes such as those shown in FIGS. 4A and 4C.

In this embodiment, the upper housing portion 104a' terminates above the upper valve seat 127 in a chamber 602, defined thereby, that is in fluid communication with: (1) the bypass check valve 501; (2) a noise attenuation unit 604 extending away from the chamber 602; and (3) the passageway 146 extending the length of the upper housing between the second check valve 111 and the bypass check valve 501. The chamber 602 has a width generally similar to the width of the bypass check valve 501, when taken relative to a longitudinal cross-section thereof as shown in FIG. 9, but the width may divergingly increase as the chamber's height increases in a direct moving away from the bypass check valve 501.

When assembled, as seen in FIG. 9, the aspirator 600 also includes, a first seal member 136 seated in check valve 111 between the upper housing portion 104a' and the Venturi portion 106a' and a second check valve disc 510 seated in an improved bypass check valve 501 between the upper housing portion 104' and the bypass portion 106b'. The improved check valve 501 (made up of a portion of the upper housing portion 104a' and the lower bypass housing 106b') defines an internal cavity 504 having a first port 506 and a second port 508 both of which are in fluid communication with the internal cavity 504. The bypass check valve 501 has the features described above with respect to FIG. 7, including the second support structure 514 and a seal member 510, and operates as described above.

The noise attenuation unit 604, may be as described in co-pending, co-owned U.S. application Ser. No. 14/593,361, filed Jan. 9, 2015, which is incorporated herein by references in its entirety. The noise attenuating unit 604 includes a housing 605 defining an internal cavity 606 enclosing a noise attenuating member 616 therein. The noise attenuating member 616 typically fits securely, at least axially, within the internal cavity 606. As illustrated in FIG. 9, the noise attenuating member 616 has a generally close fit with the interior of the cavity 606, but such a construction is not required. The housing defines a first port 610 and a second port 612 in fluid communication with the internal cavity 606. The exterior surface of at least the first ports 610 includes fitting features 611 for connecting the noise attenuating unit 604 into a fluid flow path of the engine, for example, features insertable into a hose or conduit to provide a secure fluid-tight connection thereto. In this embodiment, the second port 612 includes a lid-like feature 620 connectable to the chamber 602 of the upper housing portion 104a'. The first port 610 and the second port 612 are illustrated in FIG. 9 as positioned opposite one another to define a generally linear flow path through the noise attenuation unit 10, but the unit is not limited thereto.

The housing 605 may be a multiple piece housing with a plurality of pieces connected together with a fluid-tight seal. The multiple pieces may include a first housing portion 608 that includes the first port 610 and a second housing portion 609 that includes the second port 612. The housing portions collectively define the cavity 606 and any combination of proportion of the cavity is defined by either portion. In FIG. 9, the second housing portion 609 is illustrated as defining the majority of the cavity 606, which makes the first housing portion 608 more like a lid.

The noise attenuating member 616 comprises noise attenuating material that is porous such that fluid flow through the unit 604 is restricted the least amount possible, but sound (turbulence generated noise) is attenuated. Examples of materials and multiple embodiments for the noise attenuating member 616 are described above. In the embodiment illustrated in FIG. 9, the noise attenuating material is disposed about a core 614, which may be described as a skeletal core because it is hollow, defining an inner cavity 622, and has a plurality of openings 624 therethrough that allow fluid flow radially outward from the inner cavity 622 into the noise attenuating member 616. The inner cavity 622 is typically aligned with the direction of predominant fluid flow through the noise attenuating unit 604. The sound attenuating member 616 is a porous material such as one of those described above.

Figure 10:
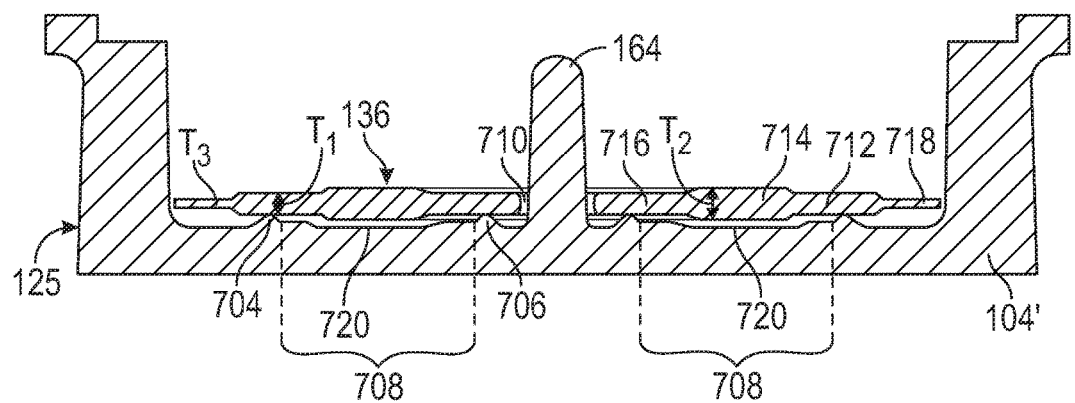
FIG. 10 is a side, partial, longitudinal cross-sectional plan view of a portion of the upper housing from FIG. 7 that defines part of check valve 111 and includes the sealing member 136.
Figure 11:
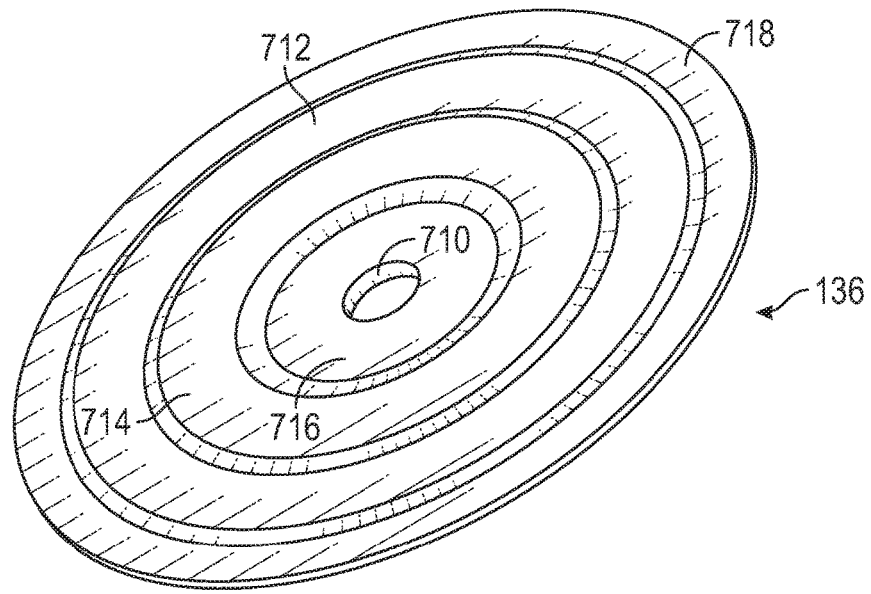
FIG. 11 is a top perspective view of the sealing member 136 of FIG. 10.

Referring now to FIGS. 10 and 11, just the upper housing portion 104' of check valve 111 from FIG. 7 is shown in an enlarged longitudinal cross-sectional plan view. The emphasis being the shape and configuration of the sealing member 136 relative to the upper valve seat 125 and its first annular seal bead 704, its second annular seal bead 706, the second annular seal bead 706 being radially inward of the first annular seal bead 704, and its connecting ribs 708. The sealing member 136 has a stepped longitudinal cross-section profile, from the outer diameter inward toward the inner diameter there are two mirror image upward steps on opposing upper and lower faces of the disk and one mirror image downward step on the opposing upper and lower faces of the disk. Described another way, the sealing member 136 has a first sealing portion 712 seatable against the first annular seal bead 704 and a second sealing portion 716 seatable against the second annular seal bead 706. The first sealing portion 712 and the second sealing portion 716 each have a first thickness $T_1$ (i.e., generally the same thickness). The sealing member 136 has an intermediate portion 714 between the first sealing portion 712 and the second sealing portion 716 that has a second thickness $T_2$ that is greater than the first thickness $T_1$, and has a lip portion 718 defining the outer periphery of the seal member 136 and having a third thickness $T_3$ that is less than the first thickness $T_1$. The sealing member 136 is translatable between a closed position against the first seat 125 and an open position against the second seat 124, shown in FIG. 7. $T_2$ is about 10% to about 80% greater than $T_1$, and more preferably about 30% to about 60% greater than $T_1$. The lip portion 718 facilitates closing of the check valve when there is a small positive pressure difference above the sealing disk, i.e., in the passageway 146 of the upper housing 104, relative to the pressure below the sealing disk, in the Venturi devices disclosed herein. The lip portion 718 readily deforms with higher flows when the pressure above the disk is lower than below the disk. The thickness $T_3$ of the lip portion 718 is about 20% to about 80% less than $T_1$, and more preferably about 30% to about 50% less than $T_1$.

The sealing member 136 is generally in the shape of a translatable disk having a generally central bore 710 therethrough that receives a pin 164 extending from the first valve seat 125 into the internal cavity of the check valve 111. The seal disk 136 translates along the pin between the open position and the closed position. The sealing member 136 is made of generally rigid material, but has some flexibility to respond to high forces from pressure differentials across the check valve. Suitable material are identified above.

Figure 12:
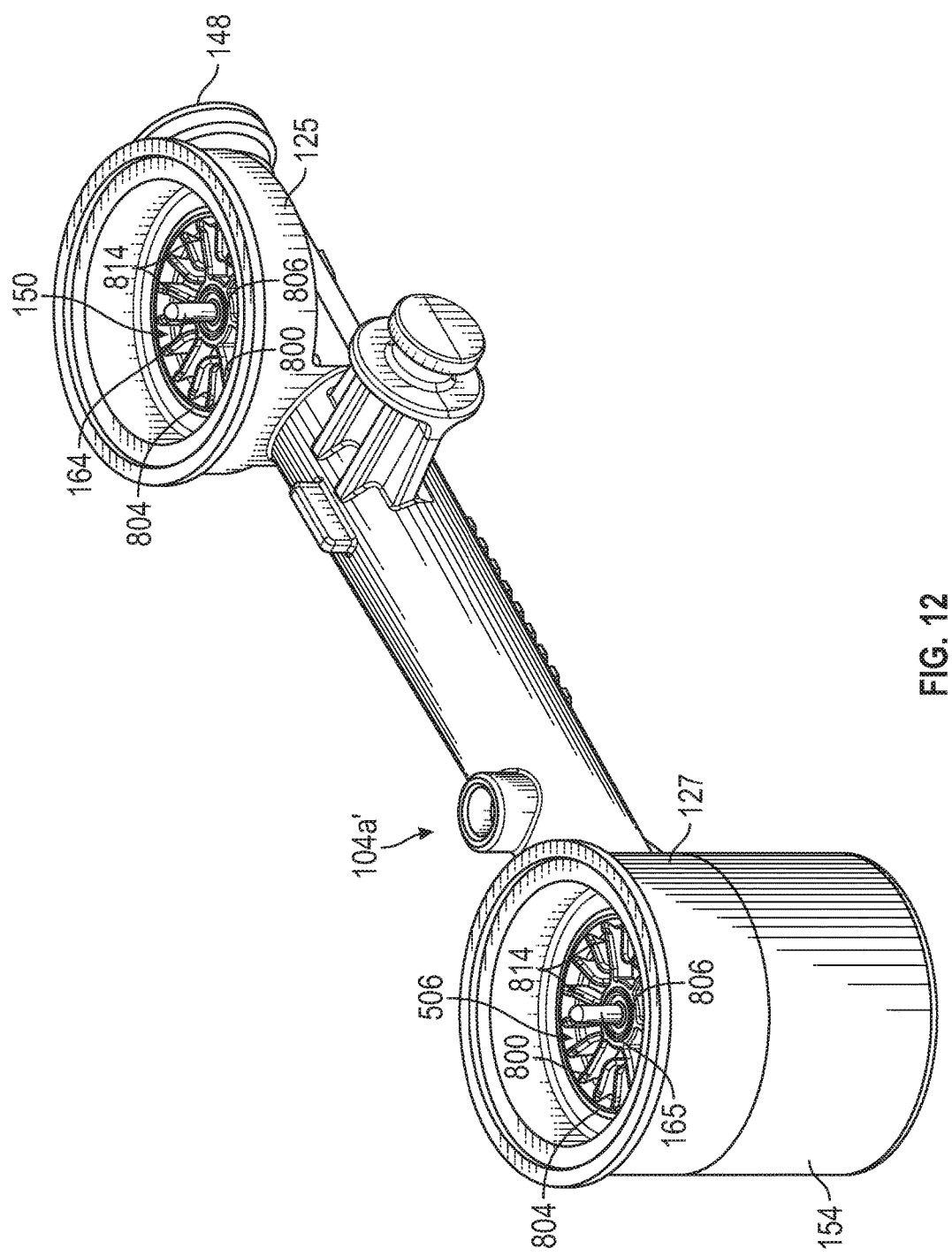
FIG. 12 is a bottom perspective view of the upper housing of the aspirator in FIG. 9.
Figure 13:
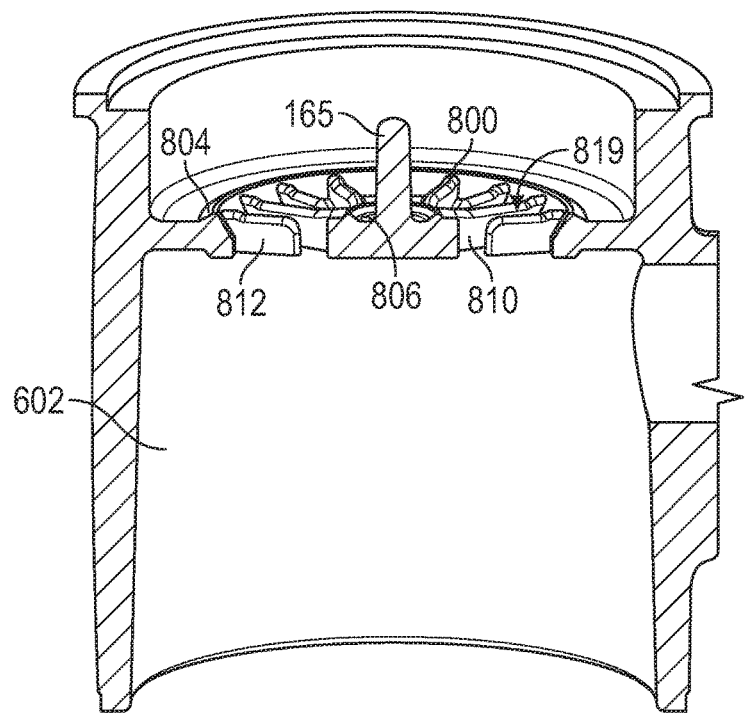
FIG. 13 is an enlarged, side, partial, longitudinal cross-sectional plan view of the bypass check valve portion of the upper housing of FIG. 12.
Figure 14:
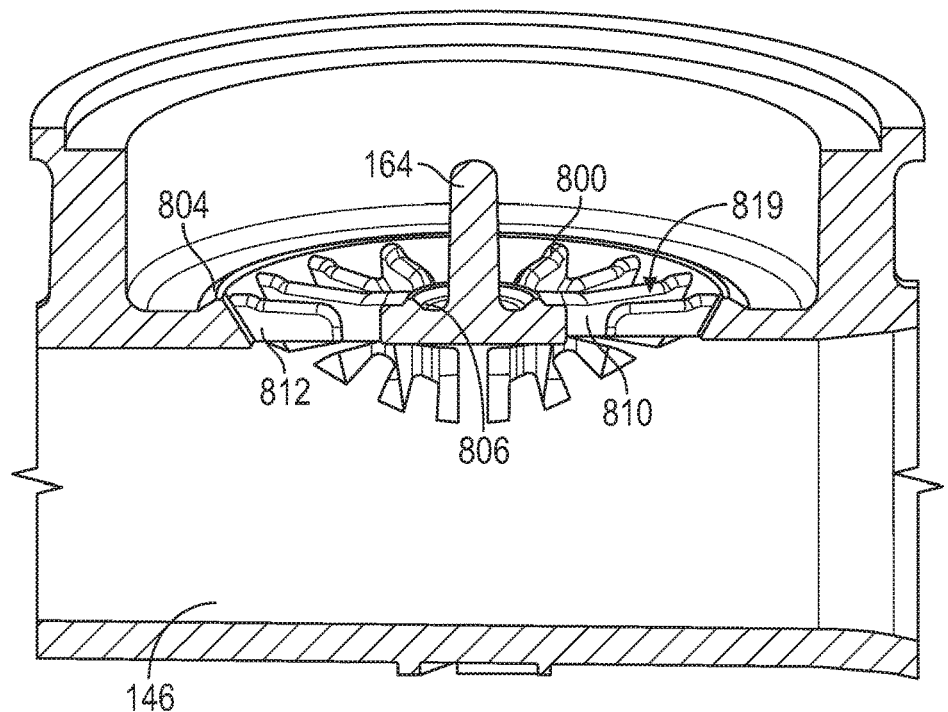
FIG. 14 is an enlarged, side, partial, longitudinal cross-sectional plan view of the Venturi check valve portion of the upper housing of FIG. 12.
Figure 15:
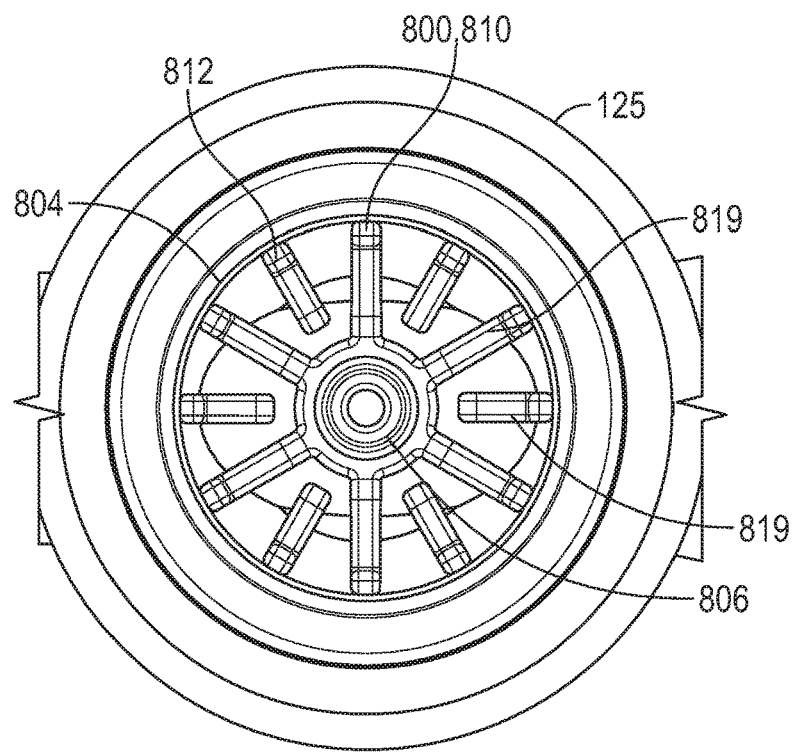
FIGS. 15-18 are alternate embodiments for the rib structure of the first seat in either or both of the bypass check valve and the Venturi check valve.
Figure 16:
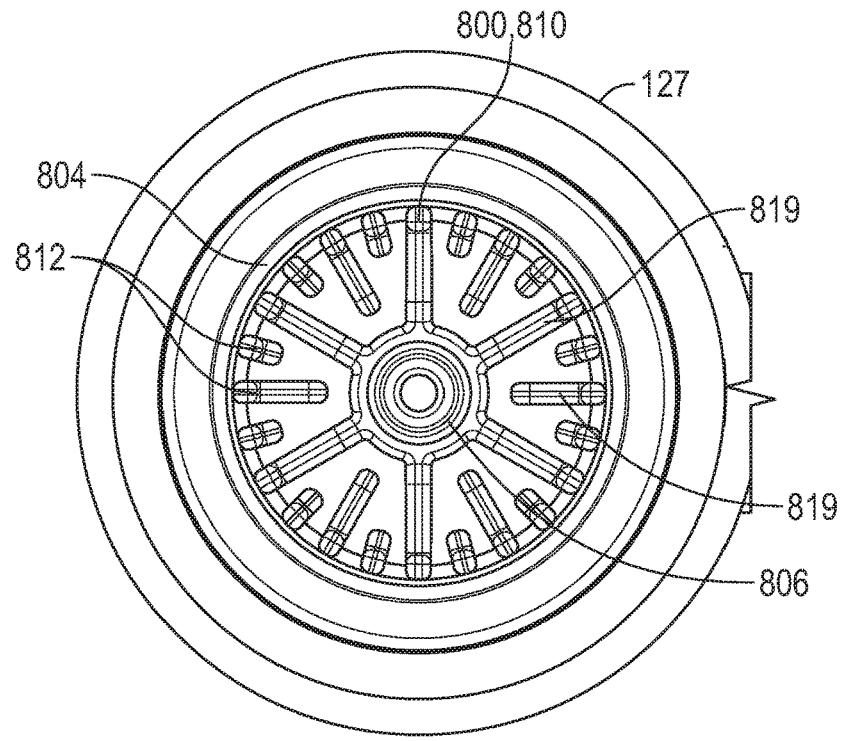
Figure 17:
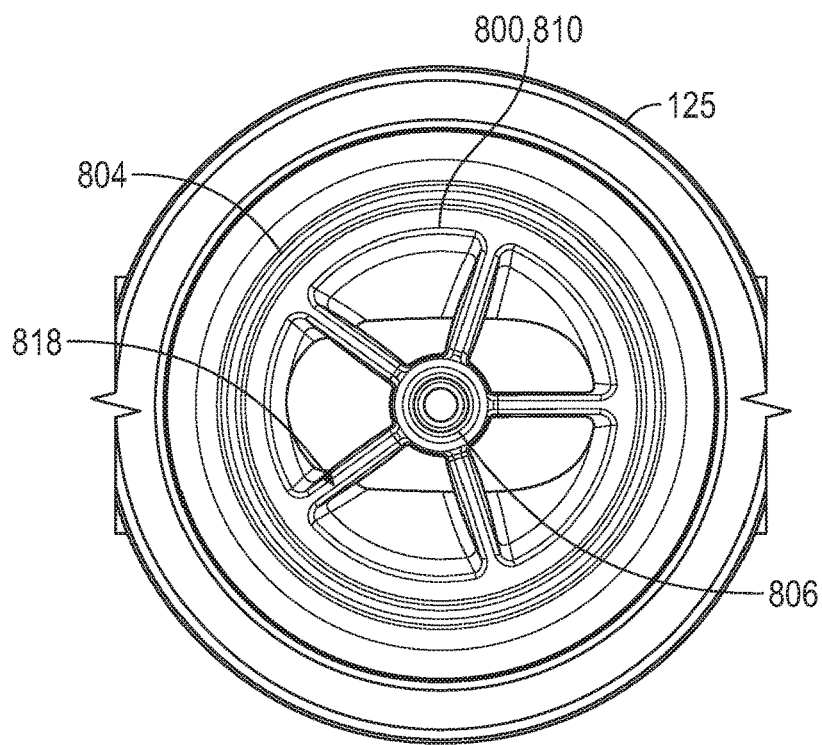

Referring now to FIGS. 12-14, just the upper housing portion 104a' from FIG. 9 is shown in an enlarged bottom perspective view. As seen from this view, both the upper valve seat 125 of the Venturi check valve 111 and the upper valve seat 127 of the bypass check valve 501 include a plurality of ribs 800 extending between a first annular seal bead 804 and a second annular seal bead 806 within the fluid flow path of the first ports 506, 150, respectively. The plurality of ribs 800 may be all connecting ribs 810 as shown in FIG. 17, or may include both connecting ribs 810 and one or more partial ribs 812 between neighboring connecting ribs 814. When the plurality of ribs are all connecting ribs 810 there are typically five or six thereof, but is not limited thereto. FIG. 17 is an example of a five connecting rib 810 configuration. When partial ribs 812 are present, the partial ribs may have the same length, axially, as shown in FIG. 12, which has a 6×2 rib configuration, and FIG. 15, which has a 6×1 rib configuration, and FIG. 18, which has a 5×1 rib configuration, or the partial ribs may have different lengths as shown in FIG. 16, which has a 6×3 rib configuration. The description of the rib configuration as a number by a number represents the number of connecting ribs by the number of partial ribs in between neighboring connecting ribs.

Figure 18:
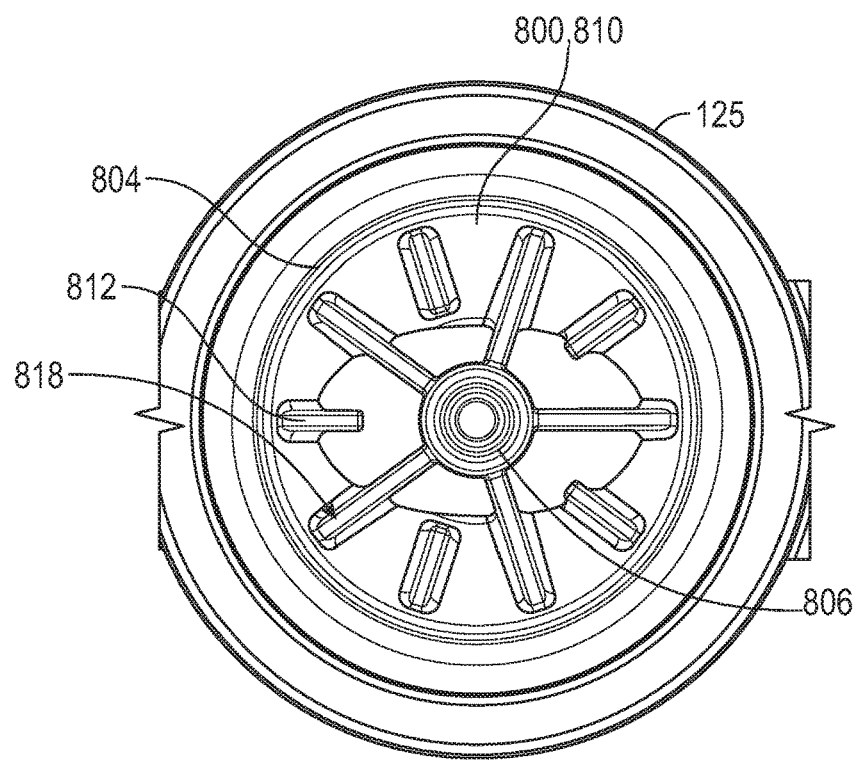
Figure 21:
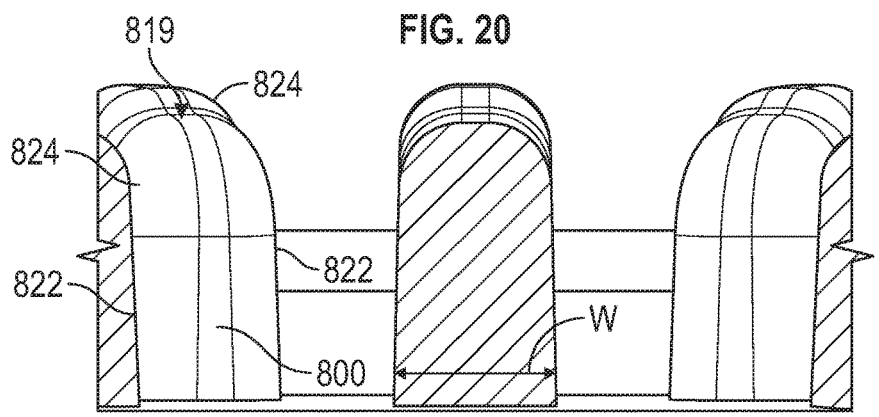
FIGS. 21 and 22 are enlarged views of ribs of a first seat to demonstrate the variances in width and radius thereof.
Figure 22:
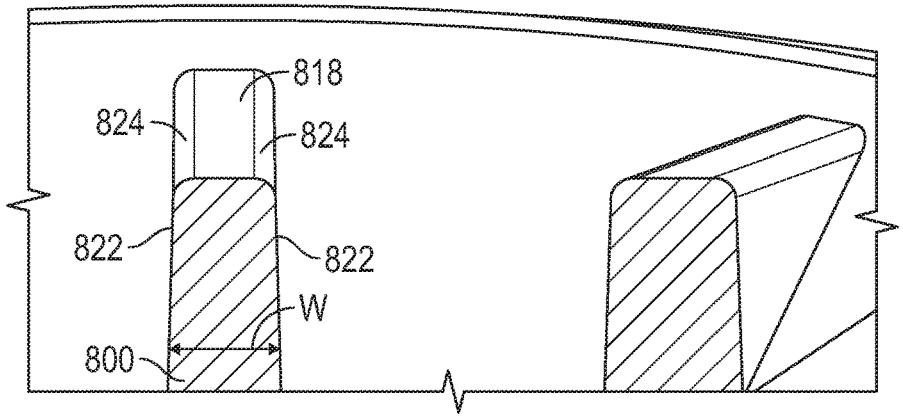

The surface of the plurality of ribs 800 facing the sealing member 136 may be a generally planar surface 818 as illustrated in FIGS. 17-18 and FIG. 22. In other embodiments, as shown in FIGS. 12-16, and 19-21, the surface of each of the plurality of ribs 800 facing the sealing member 136, in particular, the portion of surface facing the intermediate portion 714 of the sealing disk 136 is recessed a depth that forms a depression 720 (FIG. 10), 819 (FIGS. 13-16, 19-21) and defines a generally uniform gap between the sealing disk 136 and each of the plurality of ribs 800 along the portion thereof between the first annular seal bead 804 and the second annular seal bead 806, when the sealing disk 136 is seated thereagainst in a generally planar orientation in the closed state. The sealing disk 136 is in a generally planar orientation in the closed stated under an unloaded condition. The disk will become deflected when there is a lower pressure on the side of the disk facing the ribs 800 than the opposite side. Initially, when this pressure difference or delta pressure is small, the portions of the disk that touch the seal beads 704 and 706 become intimately engaged, with an excellent seal being formed between the two chambers. As the delta pressure increases the disk elastically deforms until feature 714 of the disk comes into contact with the ribs 800. Note that 718 also deforms, in an opposite direction to 714 because the feature 712 that connects 718 to 716 deforms too.

Figure 19:
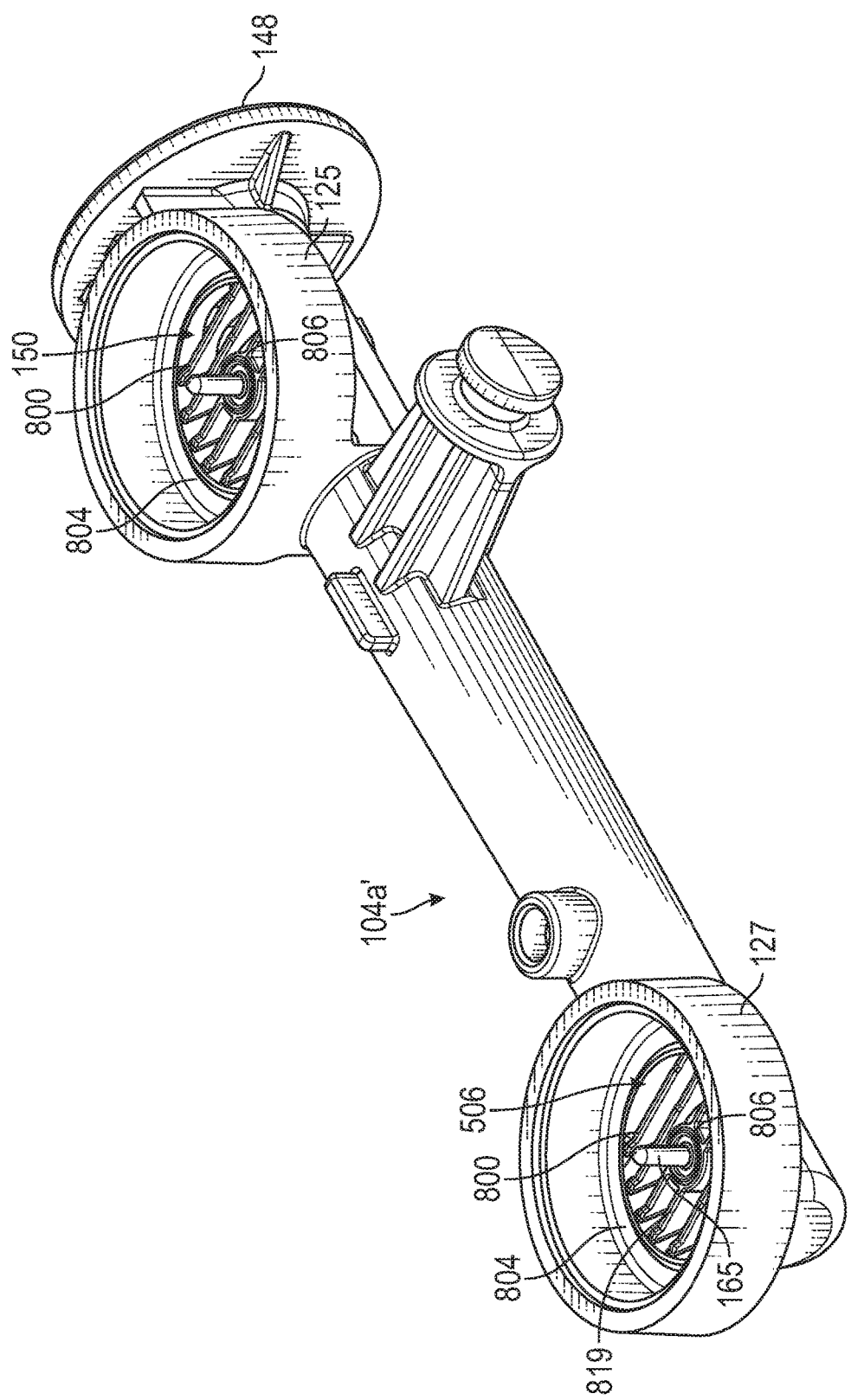
FIG. 19 is a bottom perspective view of an alternate embodiment for the upper housing of the aspirator in FIG. 9 having a grill-like first seat for both of the bypass check valve and the Venturi check valve.
Figure 20:
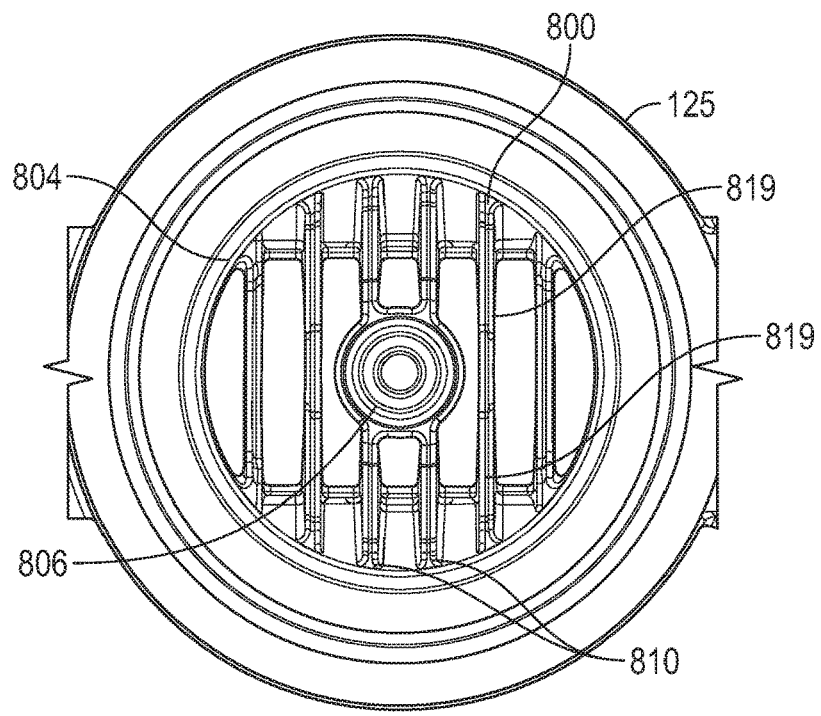
FIG. 20 is an enlarged, bottom plan view of the first seat of the bypass check valve.

Referring now to FIGS. 19 and 20, just the upper housing portion 104' from FIG. 7 is shown in an enlarged bottom perspective view. As seen from this view, both the upper valve seat 127 of the Venturi check valve 111 and the upper valve seat 125 of the bypass check valve 501 include a plurality of ribs 800 extending from the first annular seal bead 804 in an orientation transverse to a longitudinal axis of passageway 146 to define a grill of ribs 830 within the fluid flow path of the first ports 506, 150, respectively. At least one rib is a connecting rib 810 between the first annular seal bead 804 and the second annular seal bead 806.

In all embodiments, the plurality of ribs 800 are spaced apart from its most proximate neighboring rib, whether a connecting rib or a partial rib, resulting in a decrease of the flow area of the port by about 10% to about 60% of the opening without any ribs present. The width W (labeled in FIGS. 21 and 22) of each of the plurality of ribs 800 may be in a range of about 0.8 mm to about 1.6 mm, and depending upon the number of ribs and the amount of the decrease in flow area may be 1 mm in width. Also, in all the embodiments, the plurality of ribs 800 may have rounded edges 824 transitioning the generally planar surface 818 or the surface with depression 820 into the sides 822 of the rib 800 as shown in FIGS. 21 and 22. The radius of each rounded edge 824 may encroached into the width W of the surface 818, 819 about 25% to about 50% thereof, more preferably about 35% to about 50% thereof.

Referring now to FIGS. 23 and 24, a check valve 900 is disclosed that includes a housing 914 defining an internal cavity 916 having a pin 918 therein upon which is seated a sealing member 136, the stepped disk of FIG. 11 as described above, and defining a first port 922 in fluid communication with the internal cavity 916 and a second fluid port 924 in fluid communication with the internal cavity 916. The housing 914 may be a multiple piece housing with pieces connected together with a fluid-tight seal. The internal cavity 916 typically has larger dimensions than the first port 922 and the second port 924. The pin 918 is seen centrally positioned within the internal cavity 916 and a plurality of ribs 800 made up of connecting ribs 810 and/or partial ribs 812 in any of the configurations discussed above (see FIGS. 12-20) are extending radially outward from the pin 918 to subdivide the flow path leading into the internal cavity into a plurality of conduits to direct the fluid flow around the periphery of the sealing member 136 when the check valve 900 is in an open position.

Figure 25:
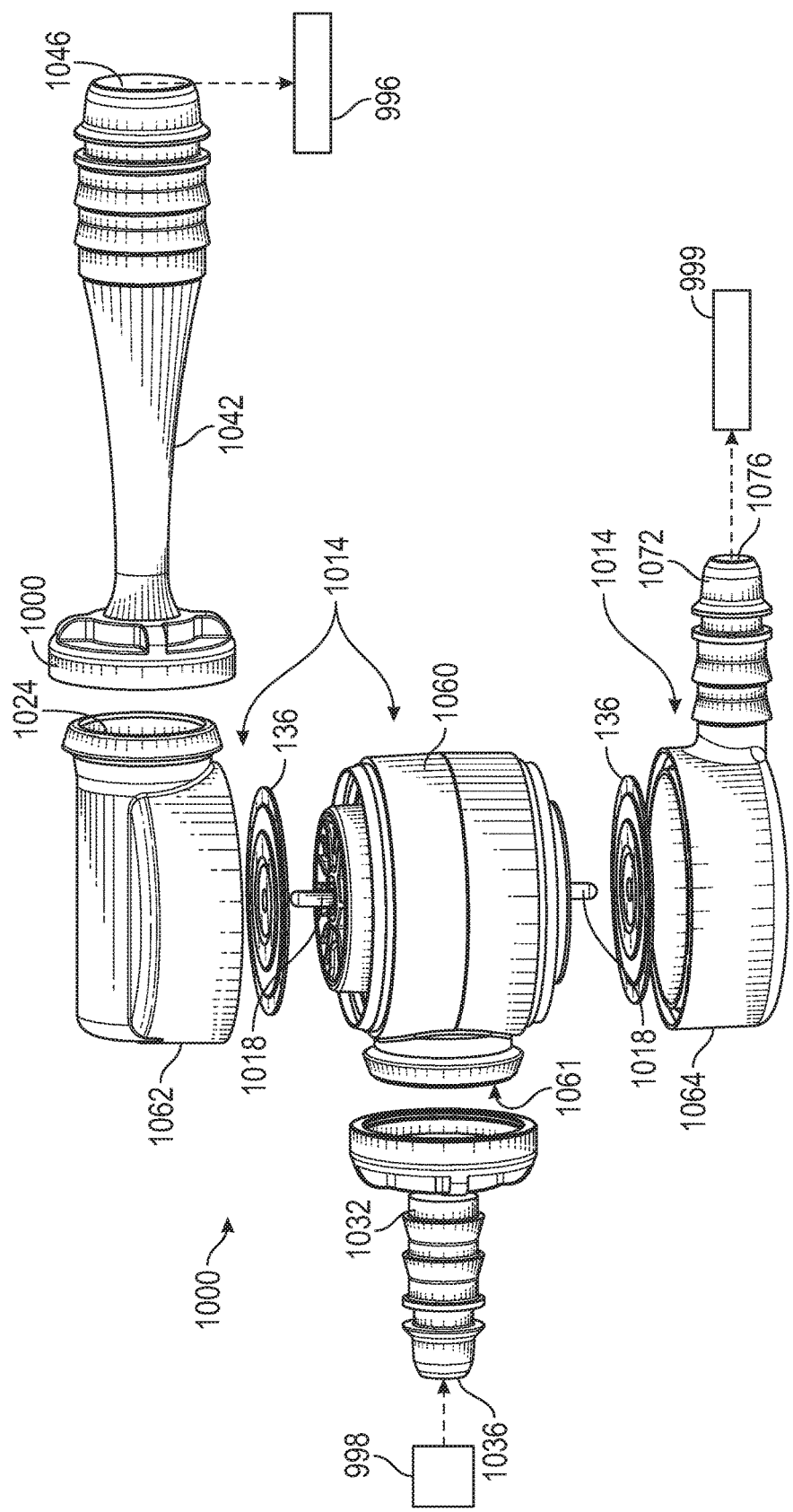
FIG. 25 is a second embodiment of a dual check valve having two stepped disks of FIG. 11, a restrictor profile in the discharge passageway, and an additional port for connect to an alternate source of vacuum.
Figure 26:
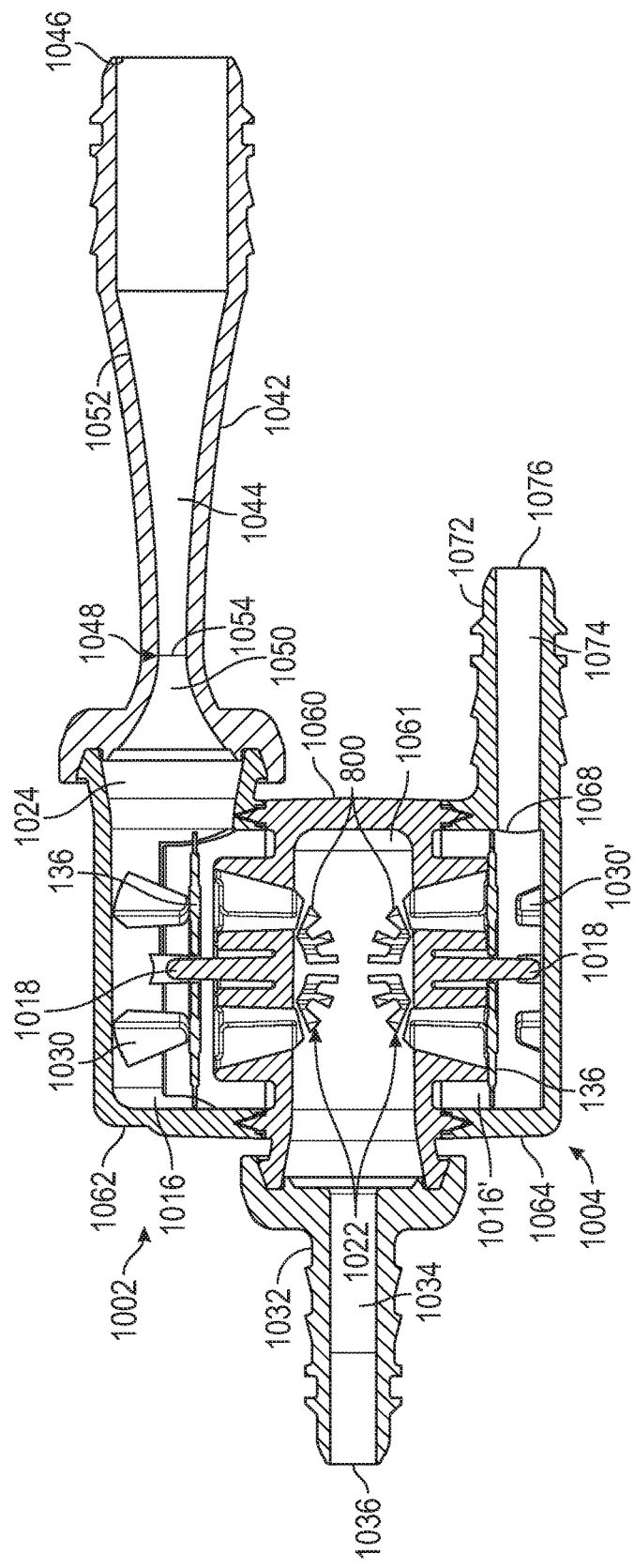
FIG. 26 is a longitudinal, cross-sectional view of the dual check valve of FIG. 25.

In the illustrated embodiment, the first port 922 and the second port 924 are positioned opposite one another, but is not limited to this configuration. In another embodiment, the first and second ports 922, 924 may be positioned relative to one another at an angle of less than 180 degrees as shown in FIGS. 25 and 26. The portion of the housing 914 defining the internal cavity 916 includes an internal first seat (here collectively first seal bead 904 and second seal bead 906, as discussed above with respect to the other embodiments) upon which the sealing member 136 seats when the check valve is "closed" and a second seat 908 upon which the sealing member seats when the check valve is "open" as shown in FIG. 24. Here, the second seat 908 is a plurality of radially spaced fingers 930 extending into the internal cavity 916 from an interior surface of the internal cavity 916 that is more proximate the second port 924.

The first port 922 and the second port 924 may each include a portion of a conduit extending therefrom that may include a connector feature on the outer surface thereof or at the end thereof for connecting the internal passageway defined by the conduit for fluid communication within a system. For example, as labeled in FIG. 24, in an internal combustion engine the conduit extending from the second port 924 is connected to the intake manifold 996 and the conduit extending from the first port 922 is connected to a device requiring vacuum 998. The conduit extending from the first port 922 is an inlet conduit 932 that defines an inlet passageway 934 and an inlet end 936. The conduit extending from the second port 924 is an outlet conduit 942 that defines an outlet passageway 944 and an outlet end 946.

The outlet passageway 944 has a restrictor profile 948. The restrictor profile 948 includes a first portion 950, more proximate the second port 924 than a second portion 952. The first portion 950 is circular, when viewed in a transverse cross-section, and narrows according to a parabolic or hyperbolic function along the length of the first portion in the downstream direction. The second portion 952 is also circular, when viewed in a transverse cross-section, but it widens according to a parabolic or hyperbolic function along the length of the second portion in the downstream direction. The length of the first portion 950 compared to the length of the second portion 952 is at least 1:3, more preferably 1:4. Where the end of the first portion 950 meets the beginning of the second portion 952 is referred to as the throat 954. The throat diameter is the parameter that determines or sets the maximum mass flow rate. A larger diameter for the throat equates to a larger mass flow rate.

When the engine intake manifold 996 is operating at below atmospheric pressure or under vacuum, the stepped disk 136 moves to the open position, where it may temporarily flex downward under appropriate pressure as shown in FIG. 24. As gas flows past the check valve it enters the restrictor profile 948 downstream of the second port 924, accelerates in the first portion 950 and then slows down in the second portion 924. The restrictor profile 948 provides the advantage of a supply of vacuum at near constant level to the device requiring vacuum, independent of engine vacuum present in the intake manifold. When the intake manifold is operating under boost conditions from a turbocharger or super charger, for example, the stepped disk 136 moves to the closed position to prevent this boosted pressure from entering the device requiring evacuation of fluid (typically gas). This check valve 900 is advantageous for devices that require low level vacuum. Low level vacuum devices require vacuum of less than 5 kPa. Typically these low level vacuum devices use vacuum to move a quantity of gas from one location into the engine intake manifold. Two examples include the crankcase ventilation system and the fuel vapor containment system. Higher vacuum levels can damage these systems, and must be prevented from occurring, which is one function of the restrictor profile 948.

In contrast, high level vacuum devices use vacuum to create a force to actuate something, such as the master cylinder being acted on by a brake boost canister or a wastegate valve being acted on by a wastegate actuator. These devices require high levels of vacuum, e.g., 20 kPa to 60 kPa, and they are designed to withstand the resulting forces.

Referring now to FIGS. 25 and 26, a dual check valve 1000 is disclosed that includes a multi-piece housing 1014 defining an upper internal cavity 1016 of the first check valve 1002 and a lower internal cavity 1017 of the second check valve 1004. The multi-piece housing has a suction housing 1060 that defines two first ports 1022, one each for each check valve 1002, 1004. Both first ports 1022 are in fluid communication with one another and in fluid communication with the same suction passageway 1061. The suction housing 1060 also defines pins 1018, one each for each of the check valves 1002, 1004, and a plurality of ribs 800, made up of connecting ribs 810 and/or partial ribs 812 in any of the configurations discussed above, extending radially outward from the pins 1018 to subdivide the flow path leading into the internal cavities 1016, 1016' into a plurality of conduits to direct the fluid flow around the periphery of each of the sealing members 136 when the check valves 1002, 1004 are in open positions. The suction housing 1060 also defines dual first seats (here, collectively a first seal bead and a second seal bead as discussed above with respect to the other embodiments) upon which the sealing member 136 seats when the check valve is "closed," as illustrated in the second check valve 1004 in FIG. 26.

The multi-piece housing 1014 includes a first check valve base 1062 defining a second seat at the tips of a plurality of radially spaced apart fingers 1030 and defining a second port 1024 in fluid communication with the upper of the two first ports 1022 as illustrated in FIG. 26. The multi-piece housing 1014 also includes a second check valve base 1064 defining a second seat at the tips of a plurality of radially spaced apart fingers 1030' and defining a second port 1068 in fluid communication with the lower of the two first ports 1022 as illustrated in FIG. 26. In the embodiment of FIGS. 25-26, the suction housing 1060 and the first check valve base 1062 define an internal cavity 1016 that is larger than the internal cavity 1016' defined by the suction housing 1060 and the second check valve base 1064, and as such, the fingers 1030 are longer than the fingers 1030'. In other embodiments, the size of the internal chamber may (by volume or by shape) be generally the same. The suction housing 1060, the first check valve base 1062 and the second check valve base 1064 are connected together with fluid-tight seals.

One or both of the first and second check valve bases 1062, 1064 may include a conduit extending from the second ports 1024, 1068, respectively, to connect the internal cavities 1016, 1016' in fluid communication with a component in a system. Referring to FIG. 25, when the dual check valve unit is connected into a system, such as an internal combustion engine, the second port 1024 of the first check valve 1062 is in fluid communication, via a discharge conduit 1042, with the intake manifold 996 of the engine, the dual first ports 1022 and suction passageway 1061, via inlet conduit 1032, are connected to a device requiring vacuum 998 (which includes a vacuum canister, as well as operating devices using vacuum assist), and the second port 1068 of the second check valve 1064 is in fluid communication, via a third conduit 1072, to a secondary vacuum source 999 other than the intake manifold 996. The inlet conduit 1032 defines an inlet passageway 1034 and an inlet end 1036. The discharge or outlet conduit 1042 defines an outlet passageway 1044 and an outlet end 1046. The third conduit 1072 defines a second outlet passageway 1074 and a second outlet end 1046. The conduits, 1032, 1042, and 1072 may be integral with its respective portion of housing 1014 or may be sealingly connectable to its respective portion of housing 1014.

The outlet passageway 1044 has a restrictor profile 1048. The restrictor profile 1048 includes a first portion 1050, more proximate the second port 1024 than a second portion 1052. The first portion 1050 is circular, when viewed in a transverse cross-section, and narrows according to a parabolic function or hyperbolic function along the length of the first portion 1052 in the downstream direction. The second portion 1052 is also circular, when viewed in a transverse cross-section, but it widens according to a parabolic function or hyperbolic function along the length of the second portion 1052 in the downstream direction. The length of the first portion 1050 compared to the length of the second portion 1052 is at least 1:3, more preferably 1:4. Where the end of the first portion 1050 meets the beginning of the second portion 1052 is referred to as the throat 1054. The throat diameter is the parameter that determines or sets the maximum mass flow rate. A larger diameter for the throat 1054 equates to a larger mass flow rate.

The second outlet passageway 1074 is illustrated a generally straight cylindrical passageway, but it may also include a restrictor profile similar to restrictor profile 1048.

The sealing members 136 in each of the first check valve 1062 and the second check valve 1064 are a stepped disk of FIG. 11 as described above.

Comparative Analysis

For the tests below, the sealing disks were constructed of the same material, which had a yield strength of 7,500 kPa.

Control:

A flat, non-stepped sealing disk in a check valve having five connecting ribs was tested under an applied pressure of 600 kPa in the closed position. The flat, non-stepped sealing disk had a deflection into the gap between the connecting ribs of 2.27 mm and had a disk stress of 11,670 kPa.

Trial 1:

The stepped sealing disk disclosed herein in a check valve having the 6×3 rib configuration shown in FIG. 16 was tested under an applied pressure of 1,400 kPa (more than two times the pressure applied to the flat, non-stepped sealing disk) in the closed position. The stepped sealing disk had a deflection into the gaps between the ribs of 1.045 mm and a disk stress of 850 kPa, while remaining sealed in the closed position.

With more than double the applied pressure, the disk stress was reduced by more than 90% and the deflection was reduced by more than half. These superior results will provide a sealing disk and check valve with a longer operating life. Moreover, the check valves disclosed herein provide an affordable design with good flow performance under all operating conditions and is one that withstands high loading while maintaining good sealing.

Having described the invention in detail and by reference to specific embodiments thereof, it will be apparent that numerous modifications and variations are possible without departing from the spirit of the invention as defined by the following claims.

What is claimed is:

1. A check valve comprising:
    a housing defining an internal cavity having a first port and a second port both in fluid communication therewith and having a first seat and a second seat, the first seat being proximate the first port and comprising a first annular seal bead and a second annular seal bead disposed radially inward of the first annular seal bead; and
    a seal disk within the internal cavity, the seal disk comprising a first sealing portion seatable against the first annular seal bead and a second sealing portion seatable against the second annular seal bead, each having a first thickness, an intermediate portion between the first sealing portion and the second sealing portion that has a second thickness that is greater than the first thickness, and a lip portion defining the outer periphery of the seal disk and having a third thickness that is less than the first thickness, wherein the seal disk is translatable between a closed position against the first seat and an open position against the second seat.

2. The check valve of claim 1, wherein the first seat further comprises a plurality of ribs extending between the first annular seal bead and the second annular seal bead within the fluid flow path of the first port.

3. The check valve of claim 2, wherein the portion of the surface of each of the plurality of ribs positioned facing the intermediate portion of the seal disk is recessed a depth that forms a generally uniform gap between the seal disk and each of the plurality of ribs between the first annular seal bead and the second annular seal bead when the seal disk is seated thereagainst in an initial state.

4. The check valve of claim 2, wherein the plurality of ribs are spaced apart from each most proximate neighboring rib to decrease the flow area by about 10% to about 60% of the opening without any ribs present.

5. The check valve of claim 2, wherein the plurality of ribs comprises five or six connecting ribs extending between the first seal bead and the second seal bead.

6. The check valve of claim 5, wherein the plurality of ribs further comprises one or more partial ribs between neighboring connecting ribs.

7. The check valve of claim 6, wherein, when there are a plurality of partial ribs between neighboring connecting ribs, the partial ribs have the same length or different lengths.

8. The check valve of claim 1, wherein the first seat further comprises a plurality of ribs extending from the first annular seal bead in an orientation transverse to a longitudinal axis to define a grill of ribs, wherein at least one rib is a connecting rib between the first annular seal bead and the second annular seal bead.

9. The check valve of claim 1, wherein the seal disk is deflectable between a generally planar closed position against the first seat and an arcuate position against the second seat.

10. The check valve of claim 9, wherein the second seat defines a support structure comprising a plurality of fingers extending into the internal cavity circumferentially spaced apart about the second port.

11. The check valve of claim 1, wherein the housing includes a pin extending into the internal cavity, the seal disk includes a bore therethrough, and the pin of the housing is received in the bore of the seal disk for translation of the seal disk along the pin.

12. The check valve of claim 1 wherein the second port includes a discharge passageway having a restrictor profile.

13. The check valve of claim 12, wherein the second port is in fluid communication with an intake manifold of an internal combustion engine.

14. A Venturi device comprising:
a check valve according to claim 1 controlling fluid flow through a bypass port disposed downstream of and bypassing a Venturi gap and/or a check valve according to claim 1 controlling fluid flow through a Venturi gap.

15. The Venturi device of claim 14, wherein the first seat further comprises a plurality of ribs extending between the first annular seal bead and the second annular seal bead within the fluid flow path of the first port.

16. The Venturi device of claim 15, wherein the plurality of ribs comprises five or six connecting ribs extending between the first seal bead and the second.

17. The Venturi device of claim 15, wherein the plurality of ribs further comprises one or more partial ribs between neighboring connecting ribs.

18. The Venturi device of claim 14, wherein the first seat further comprises a plurality of ribs extending from the first annular seal bead in an orientation transverse to a longitudinal axis to define a grill of ribs, wherein at least one rib is a connecting rib between the first annular seal bead and the second annular seal bead.

19. The Venturi device of claim 14, wherein the seal disk is deflectable between a generally planar closed position against the first seat and an arcuate position against the second seat.

20. The Venturi device of claim 19, wherein the second seat defines a support structure comprising a plurality of fingers extending into the internal cavity circumferentially spaced apart about the second port.

21. The Venturi device of claim 14, further comprising a sound attenuating member disposed in the fluid path between the Venturi gap and the bypass port and/or a sound attenuating member connected thereto upstream of an inlet port into the bypass check valve.

22. An engine system comprising the Venturi device of claim 14 connected to a device requiring vacuum.

* * * * *